United States Patent
Humpal et al.

(10) Patent No.: US 10,444,048 B2
(45) Date of Patent: Oct. 15, 2019

(54) FLUID FLOW MONITORING SYSTEM

(71) Applicant: Deere & Company, Moline, IL (US)

(72) Inventors: Richard A. Humpal, Ankeny, IA (US); Dolly Y. Wu, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 212 days.

(21) Appl. No.: 14/927,777

(22) Filed: Oct. 30, 2015

(65) Prior Publication Data

US 2016/0178422 A1 Jun. 23, 2016

Related U.S. Application Data

(60) Provisional application No. 62/094,538, filed on Dec. 19, 2014.

(51) Int. Cl.
*A01M 7/00* (2006.01)
*G01F 1/698* (2006.01)
(Continued)

(52) U.S. Cl.
CPC ............ *G01F 1/698* (2013.01); *A01C 15/003* (2013.01); *A01M 7/006* (2013.01); *A01M 7/0042* (2013.01); *A01M 7/0089* (2013.01); *B05B 1/1645* (2013.01); *B05B 1/20* (2013.01); *B05B 1/30* (2013.01); *B05B 12/008* (2013.01); *G01F 1/69* (2013.01); *B05B 13/005* (2013.01)

(58) Field of Classification Search
CPC ......... G01F 1/69; G01F 1/698; B05B 12/004; B05B 12/006; A01G 25/16–165

USPC ............ 239/71, 73, 74; 73/204.11; 700/280, 700/284, 241
See application file for complete search history.

(56) References Cited

U.S. PATENT DOCUMENTS

| | | | |
|---|---|---|---|
| 4,177,675 A | | 12/1979 | Baker |
| 4,642,614 A | * | 2/1987 | Cook ...................... F16N 29/00 137/552 |

(Continued)

FOREIGN PATENT DOCUMENTS

| | | |
|---|---|---|
| EP | 0150998 A2 | 8/1985 |
| JP | 2005296706 A | 10/2005 |
| WO | 2005085815 A2 | 9/2005 |

OTHER PUBLICATIONS

"Thermistor." Wikipedia [online] [retrieved on Nov. 23, 2014]. Retrieved from the Internet: <https://en.wikipedia.org/wiki/Thermistor>.

(Continued)

*Primary Examiner* — Arthur O. Hall
*Assistant Examiner* — Tuongminh N Pham

(57) ABSTRACT

Embodiments of a sprayer system having spray nozzles; each nozzle includes a thermistor or resistor that provides an electronic current or voltage value correlated with a flow rate or a local temperature. A low flow rate indicates of a fluid flow clog or plug within the nozzle or conduit. The flow rate or temperature results among the different nozzles are compared to detect which nozzles are partially or entirely clogged or otherwise anomalous. In various embodiments, the thermistor electronics are integrated in each individual nozzle. In some embodiments, upon detection of a potential clog, the electronics create an alert and respond to the clogged condition.

20 Claims, 27 Drawing Sheets

(51) Int. Cl.
*G01F 1/69* (2006.01)
*A01C 15/00* (2006.01)
*B05B 1/30* (2006.01)
*B05B 1/16* (2006.01)
*B05B 1/20* (2006.01)
*B05B 12/00* (2018.01)
*B05B 13/00* (2006.01)

(56) References Cited

U.S. PATENT DOCUMENTS

| | | | |
|---|---|---|---|
| 5,927,603 A | 7/1999 | McNabb | |
| 7,311,004 B2 | 12/2007 | Giles | |
| 8,833,680 B2 | 9/2014 | Ellingson et al. | |
| 2004/0173019 A1* | 9/2004 | McMillan | G01F 1/6847 73/204.16 |
| 2004/0211253 A1* | 10/2004 | Horie | G01F 1/6845 73/204.15 |
| 2007/0295083 A1* | 12/2007 | Kawai | G01F 1/6845 73/204.26 |
| 2008/0016959 A1* | 1/2008 | Nakano | G01F 1/6842 73/204.26 |
| 2010/0032492 A1* | 2/2010 | Grimm | A01M 7/0089 239/1 |
| 2012/0168530 A1* | 7/2012 | Ellingson | B05B 12/008 239/71 |

OTHER PUBLICATIONS

European Search Report issued in foreign counterpart application No. 15200817.3, dated May 23, 2016 (6 pages).

* cited by examiner

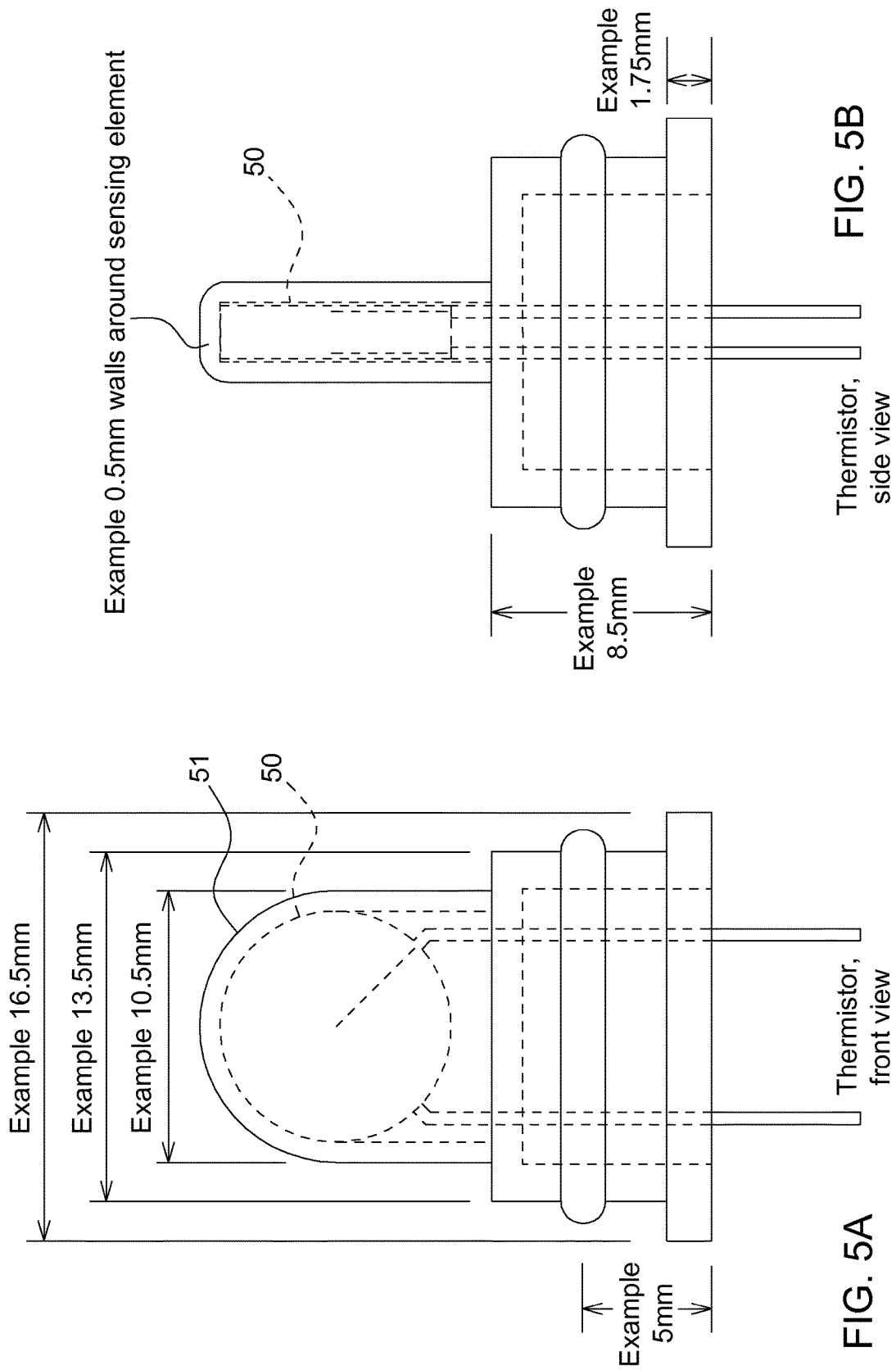
FIG. 5B Thermistor, side view
FIG. 5A Thermistor, front view

Thermistor, side view

Thermistor, front view

Example: R<sub>sense</sub> and Thermistor same material

FLUID FLOW MONITORING SYSTEM

RELATED APPLICATIONS

This patent application also claims priority to U.S. Provisional Patent Application Ser. No. 62/094,538, filed Dec. 19, 2014, and entitled, FLUID FLOW MONITORING SYSTEM, the contents of which are incorporated herein by reference.

TECHNICAL FIELD

This disclosure relates generally to monitoring fluid flow distribution systems having outlets.

BACKGROUND

Fluid distribution systems apply nutrients, herbicides, paints, chemicals and other liquids such those used in agriculture or industrial applications. For large area spraying, the distribution system tends to have many spray nozzle outlets, often seventy or more outlets. The conduits leading to nozzles and the orifices in the nozzles are often narrow enough such that the conduits or nozzles become clogged by dust and debris or by the coagulation of the spray chemical. Then the spray output is no longer uniform or is an inadequate amount. Given the large number of outlets, it is time consuming to visually monitor and fix a clog or plug problem. Also, the end-user or operator may not have direct view of the spray nozzles or conduits and the spray output, and may not even realize an outlet is no longer spraying properly. Additionally, the spray task would take much longer if the operator has to stop and fix the problem.

Summary

Various aspects of example embodiments are set out in the claims. Embodiments include a sprayer system having spray nozzles; each nozzle includes a thermistor or resistor that provides an electronic current or voltage value correlated with a flow rate or a local temperature. A low flow rate indicates of a fluid flow clog or plug within the nozzle or conduit. The flow rate or temperature results among the different nozzles are compared to detect which nozzles are partially or entirely clogged or otherwise anomalous. In various embodiments, the thermistor electronics are integrated in each individual nozzle. In some embodiments, upon detection of a potential clog, the electronics create an alert and respond to the clogged condition. Other embodiments are disclosed in the detailed description, accompanying drawings and claims.

BRIEF DESCRIPTION OF THE DRAWINGS

The detailed description refers to the following example figures:

FIG. 5A depicts a front view of an example thermistor.

FIG. 5B depicts a side view of the example thermistor in FIG. 5A.

DETAILED DESCRIPTION

This disclosure provides example embodiments where a suitable material such as thermistors or resistors (collectively, "thermistor") is placed in a fluid in a spray nozzle or conduit; the thermistor operates as a flow sensor. The thermistor is used to both heat the spray fluid and to provide a measurement value (e.g. current or voltage) that is directly related to a temperature of the local fluid in the spray nozzle or conduit. The measurement value determines the resistance of the thermistor, and temperature may then be derived from the resistance based on the Steinhart-Hart equation or on a temperature coefficient equation of a particular material. The local fluid is warmed by the thermal energy generated when a current passes through a resistance of the thermistor. When the fluid is moving rapidly past the thermistor, the thermistor does not have sufficient time to overheat, rail or become defective. Flowing fluid is similar to an isotropic or constant temperature bath so that the thermistor dissipates its heat in the bath and does not have time to warm up. However, if there is a clog, the fluid is stagnant, and the local fluid is heated by the thermistor and the thermistor remains hot and its resistance changes. The measured values of current or voltage or the derived resistance values of the many spray nozzles or conduits are compared to detect anomalous conditions in one or more of the spray nozzles or conduits. Alternatively, a plugged condition is assumed to have occurred when it is no longer possible to maintain a current at a particular voltage value. The voltage or currents have gone past pre-determined threshold values. Upon detection of a pre-determined amount of variance among the different nozzles, an indication of a reduced flow rate, fluid clog or other defect is generated, and then various actions subsequently occur or can be selectively activated in an attempt to remove the clog. For example, a sieve or filter in the nozzle traps dirt and particles; and the nozzle is periodically turned over. Or the opposing valves in a nozzle are pulsed to act as a plunger on the fluid to expel the clogging particles.

To provide concrete examples, the system and methods are described in the context of an agricultural sprayer having many nozzles. The sprayers include aircraft-flown or vehicle-towed spray equipment, self-propelled sprayers, irrigation sprinklers, and so on. A variance among the measured values for the nozzles is used to detect plugs or other potential problems, such as a wrong nozzle tip, wrong nozzle position, cracked nozzles, and so on. Aside from agricultural end-uses, industrial nozzles used to paint surfaces, distribute food liquids or oil may also benefit from the example embodiments described herein.

Figure 1:
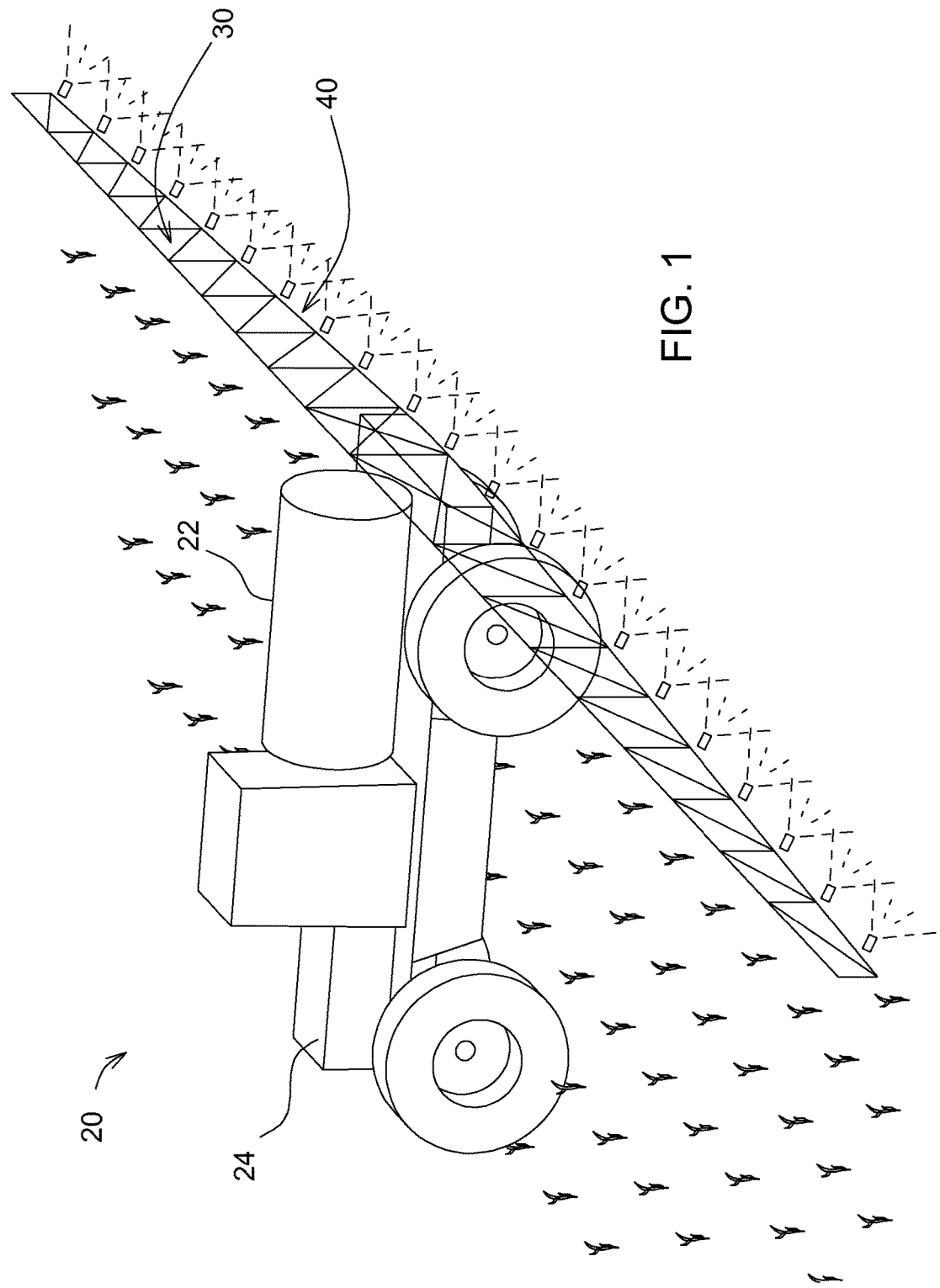
FIG. 1 depicts an example vehicle carrying a spray boom.

FIG. 1 depicts a top view of an example vehicle 20 towing a chemical storage tank 22 and also a spray boom 30 having many spray nozzles 40. In other embodiments, the boom 30 is mounted to the front 24 of the vehicle 20, where the spray nozzles 40 are more visible to an operator but may still be obstructed from view especially near night time. Fluids from a chemical tank 22 are transferred through manifolds, fluid distribution pipes and other feed lines that are attached to the boom 30. The side of the boom 30 also includes main opening/closing section valves 44 (e.g. FIG. 19, 24) that control fluids to the fluid pipe 42 (e.g. FIG. 24) and subsequently to the nozzles 40. The thermistor 50 and accompanying electronics are situated inside each nozzle 40 and optionally also in the main opening/closing section valves 44. Alternatively, the electronics are located at a boom section controller, remote from the nozzles 40.

Figure 2:
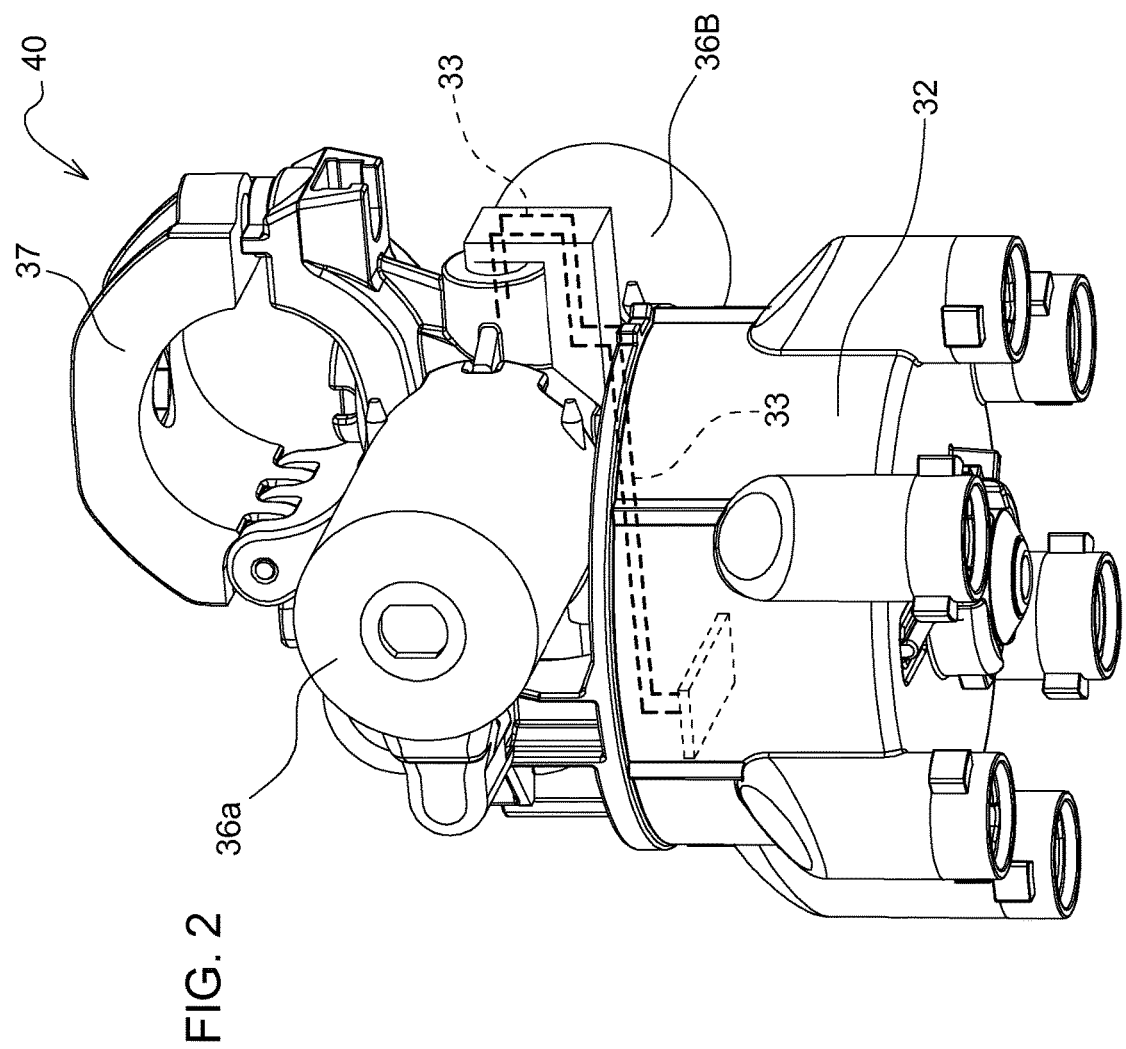
FIG. 2 depicts an example nozzle that includes a flow sensor and corresponding electronics.
Figure 5D:
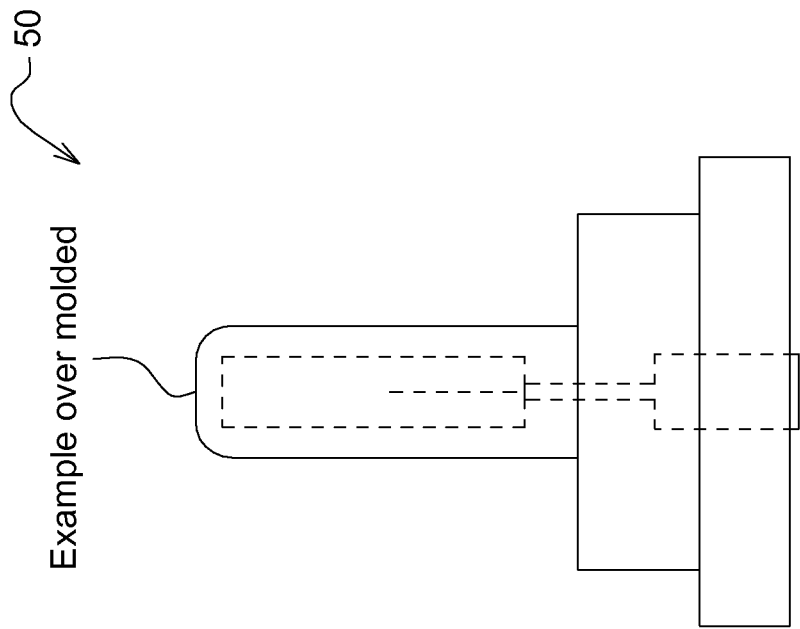
FIG. 5D depicts a side view of the example thermistor in FIG. 5A.
Figure 5C:
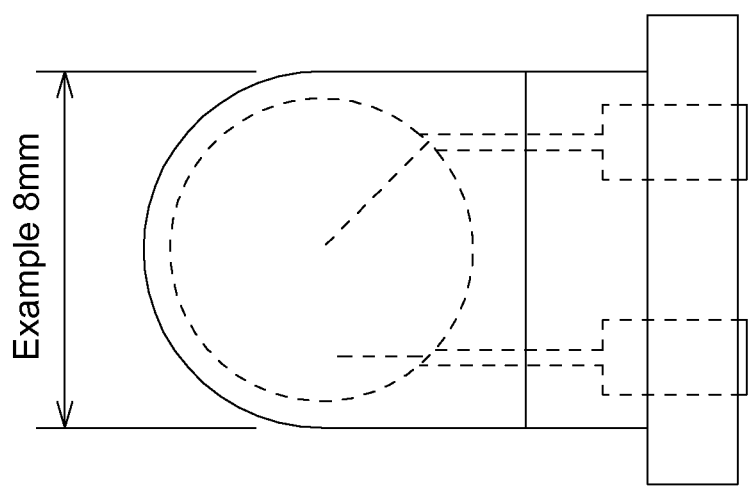
FIG. 5C depicts a front view of an example thermistor.

In various embodiments, the thermistor 50 is placed near an inlet of a nozzle 40, where the entire amount of fluid for a nozzle flows past the thermistor 50. FIG. 2 depicts an example embodiment of nozzle 40 having where fluid flows from a distribution pipe 42 to inlet 34, then to the orifice 38 near the inlet of nozzle 40. On either side of orifice 38, there are nozzle tubes 36A and 36B (collectively "36"); 36A and 36B have a common central axis (parallel to the tube) and tubes 36 are perpendicular to the circular ring 37 that is used to mount nozzle 40 to a fluid distribution pipe 42. Nozzle 40 contains a thermistor 50 mounted at a neck of the orifice 38, approximately between the nozzle tubes 36 that have solenoid valves 362A, 362B or other walls on each end of the tubes 36; the valves allow the fluid to flow from the inlet 34 and orifice 38 to other ducts or chambers in the nozzle 40; the other chambers include a turret 32 that is connected to the nozzle tube 36. The fluid flows past thermistor 50 that is placed approximately perpendicular to the direction of fluid flow; there is a ledge to which the terminal leads of thermistor 50 are clipped; or there is a socket in an interior wall of the orifice 38 to which a thermistor 50 is plugged into. An example thermistor 50 is depicted in FIGS. 5A (front view) and 5B (side view); the dimensions are in millimeters. A smaller example thermistor 50 is depicted in FIGS. 5C and 5D. There is an optional nylon or plastic sieve either above or below thermistor 50 to trap particles that may undesirably enter the nozzle 40. Alternatively, to avoid obstructing the fluid flow, thermistor 50 is embedded conforming to an interior surface of the nozzle tube 36 or orifice 38. Each end terminal of the thermistor 50 is connected to an electronic trace or wire 33 that go to electronic circuits 382. The electronic signal traces or wires 33 stamped along a surface of the nozzle 40. Or the traces and wires 33 are (hermetically) sealed and travel along a small duct that is shown in the back of the nozzle tube 36, and return back into the body of the nozzle 40. The electronic circuits 382 are located in a moisture proof chamber inside the nozzle 40. In other embodiments, the signal traces 33 travel to a bus (e.g. CAN-bus) to a signal processing master or sectional controller external to a group of nozzles 40. In the example of FIG. 2, the thermistor 50 is located in the fluid, but not the subsequent processing circuits 382. The thermistor 50 is moisture or water resistant or otherwise hermetically encased in ceramic, metal, semi-plastic, or polymer or other material that readily conducts heat (e.g. coolpoly elastomers that conduct heat but not electrical signals).

Figure 3:
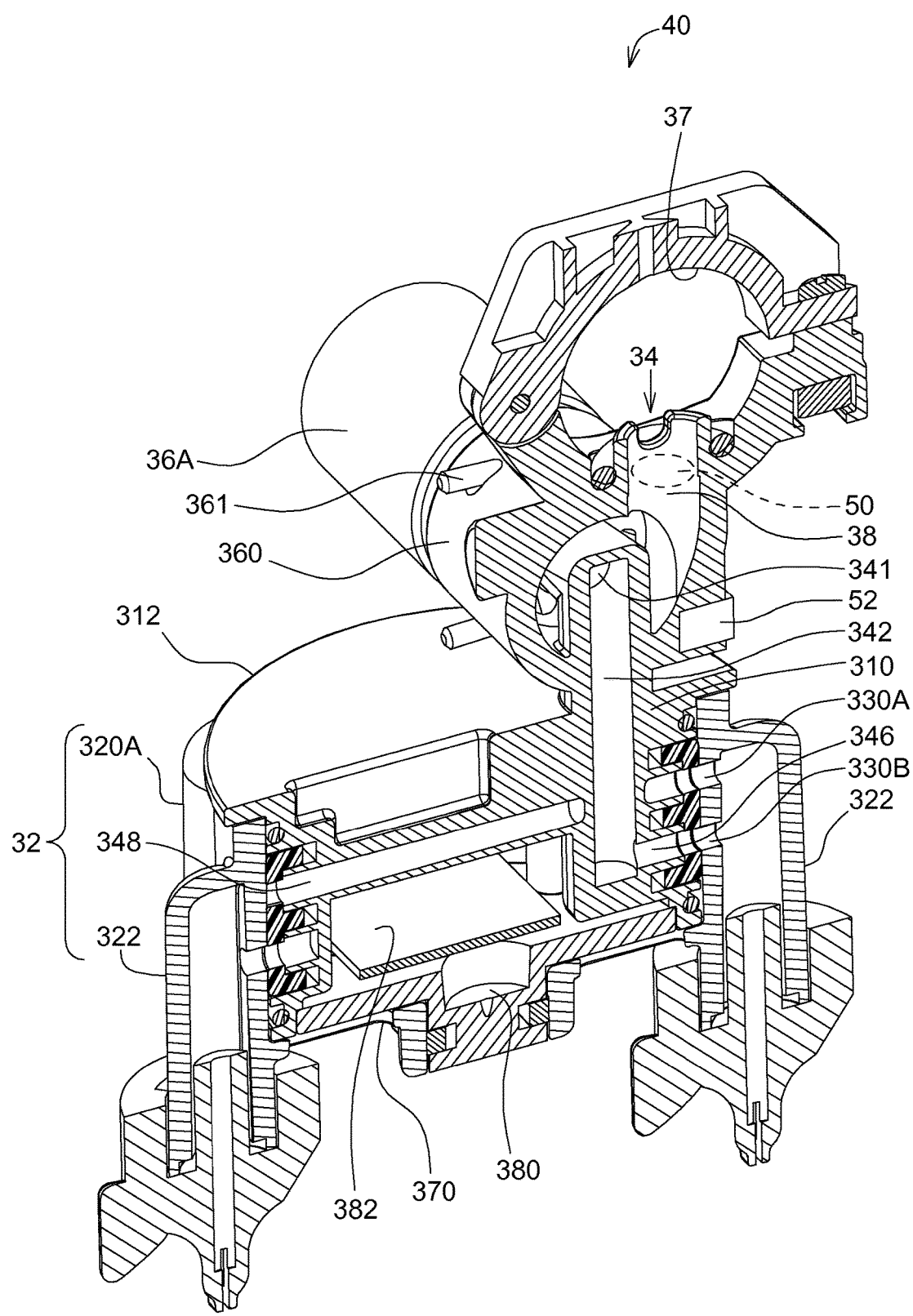
FIG. 3 depicts a cross section of the example of FIG. 2.
Figure 4:
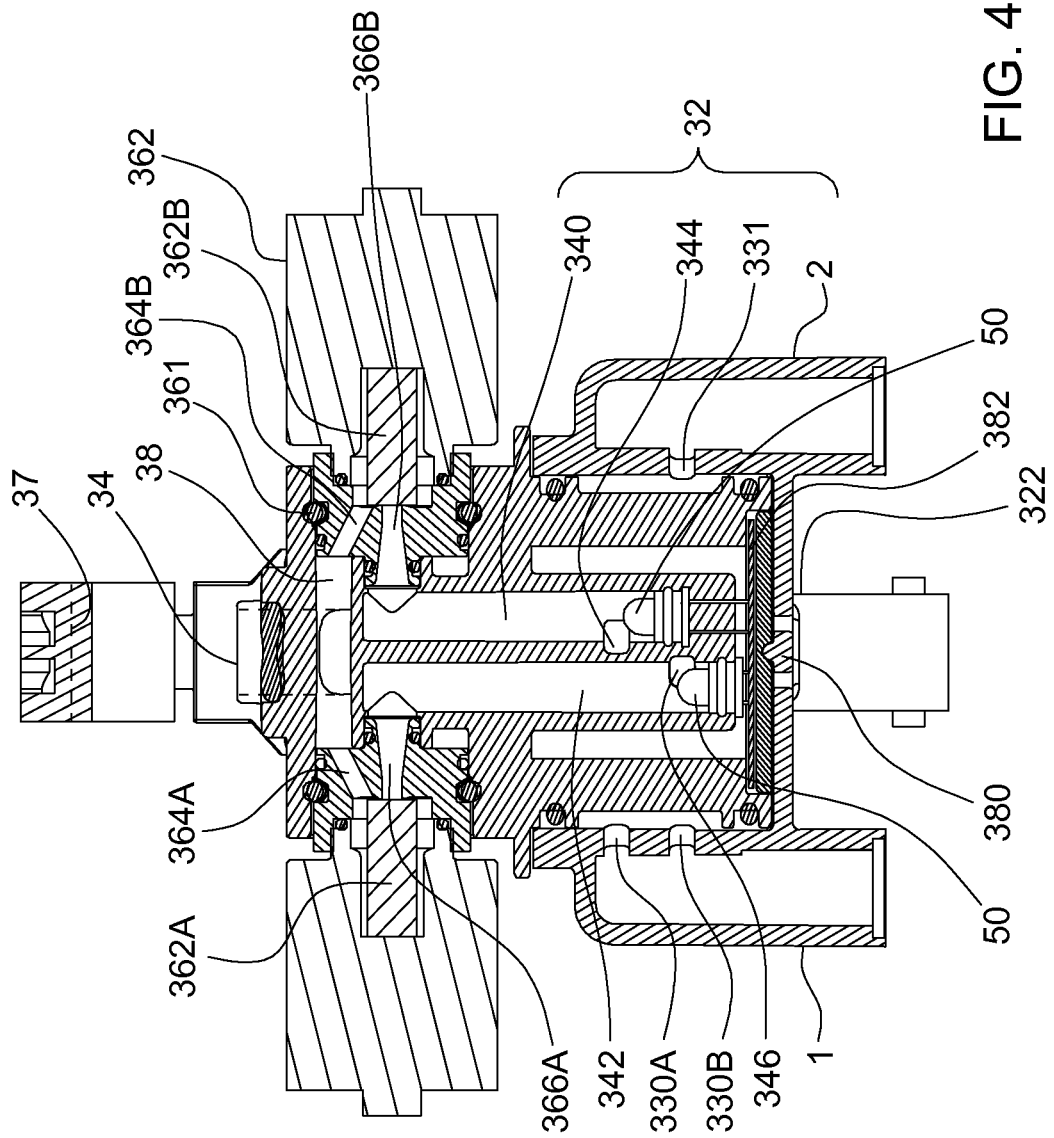
FIG. 4 depicts another cross section of the example of FIG. 2.

In the example of FIG. 2, there are additional elements such as actuators and valves 362A, 362B that enable or disable fluid flow; they also play a role in one method of dislodging a clogged nozzle 40 as described later in this disclosure. Example actuators include solenoid valves 362A, 362B, electromagnetic spring coil, pneumatic lever, bellows, and so on. Turret 32 is manually-rotatable or motor-rotatable and attached to a lower end of the nozzle tube 36; alternatively, turret 32 is attached to a rotatable plate 312 that is electronically controlled. Turret 32 includes a squat cylindrical body. Turret 32 also contains passageways that channel fluid from the nozzle tube 36 to nozzle outlets. Nozzle outlets 1-6 are located on the periphery of turret 32. Turret 32 is manually rotated if there is no plate 312 or automatically rotated if there is a plate 312 and a corresponding motor to turn plate 312 (e.g. stepper motor). FIGS. 3 and 4 depict a cross section of the example nozzle of FIG. 2; FIG. 3 exposes the nozzle 40 at a plane that is slightly to one side of the center of nozzle tube 36 across the short axis or diameter of the nozzle tube 36. Turret 32 contains electronic circuits 382 to operate and monitor the thermistor 50, currents and voltage, sensors (e.g. pressure), and the turret rotation position. The electronic circuits 382 are located in a moisture proof compartment in turret 32. Electrical wiring or traces embedded in the wall of the nozzle 40 electrically connect the thermistor 50 to the electronic circuits 382.

In various embodiments, the thermistor(s) 50 are placed in an interior duct or orifice of a nozzle 40, where only portion of or the entire amount of fluid for a nozzle, flows past each thermistor 50. For example, the nozzle 40 of FIG. 4 may be operated in multiple ways such that only one nozzle outlet or multiple outlets release fluid. A thermistor 50 is thus located in each individual section of the nozzle 40, where fluid may flow. FIG. 4 depicts another cross section of the example nozzle of FIG. 2, exposing the nozzle 40 at a plane of the nozzle tube 360 across its long axis. Circular mount ring 37 permits mounting nozzle tube 36 to a fluid distribution pipe 42. Nozzle tube 36 has an inlet 34 that provides fluid to an orifice 38, on either side of which are solenoid valves 362A and 362B in the nozzle tube 36. If the solenoid valves 362A and 362B are in an open position, the fluid then flows towards vertical connection channels or ducts 340 and 342 in the turret 32. The vertical connection ducts 342 and 340 have release holes 346 and 344, respectively that are located near the lower end of connection ducts 342 and 340. Depending on the position in which turret 32 is rotated, the release holes 346 and 344 mate with horizontal channels that mate with one or more apertures (330A, 330B, 331) connected to the nozzle outlets 1-6. This is diagrammatically shown in FIG. 21, the selected nozzle outlet(s) 1-6 are positioned to receive fluid from the nozzle tube 36 when a horizontal channels, internal conduits A and/or B, are aligned with an apertures (330A, 330B, 331) to an outlet 1-6.

Figure 6:
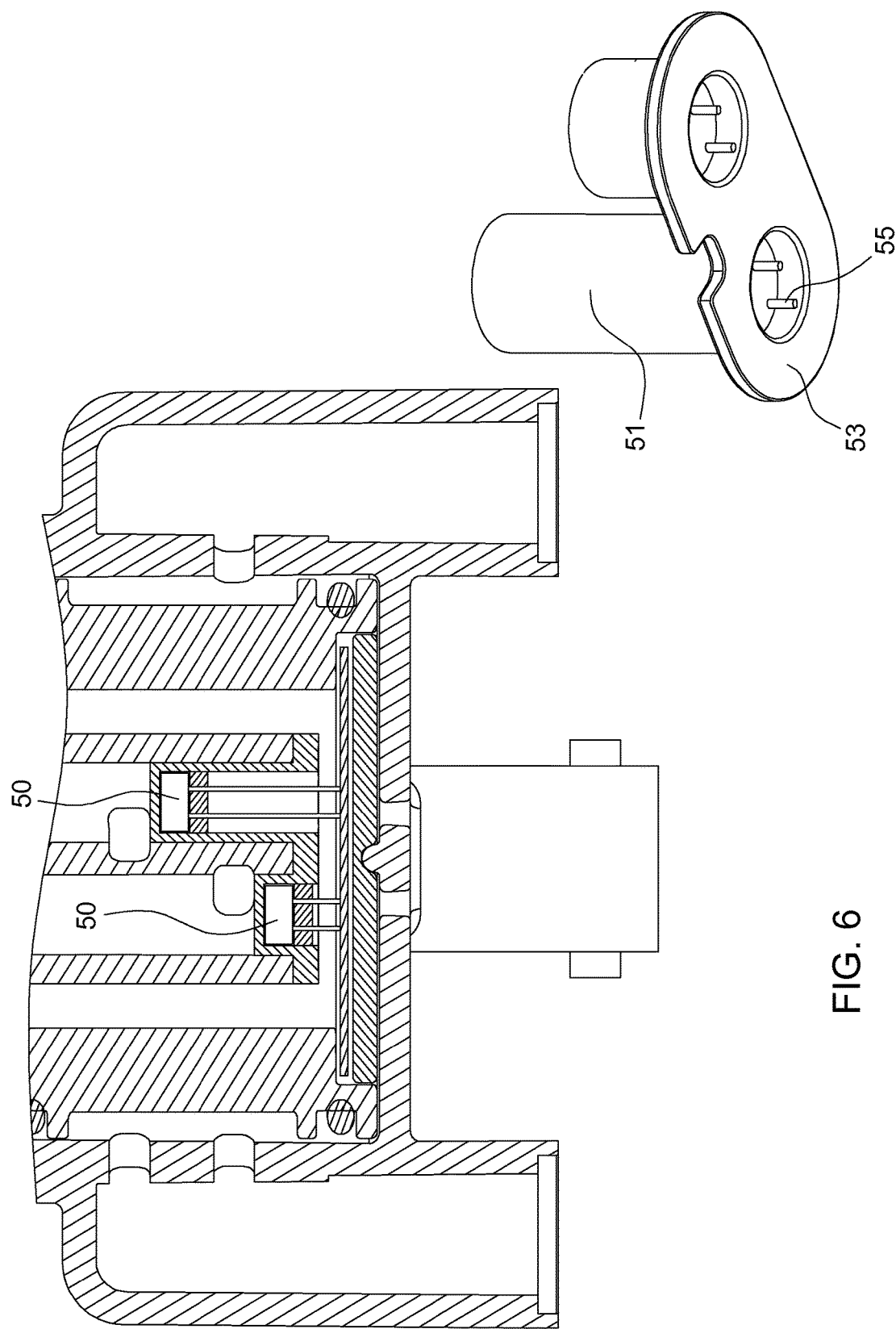
FIG. 6 depicts an example pair of thermistors in a nozzle cavity.
Figure 7:
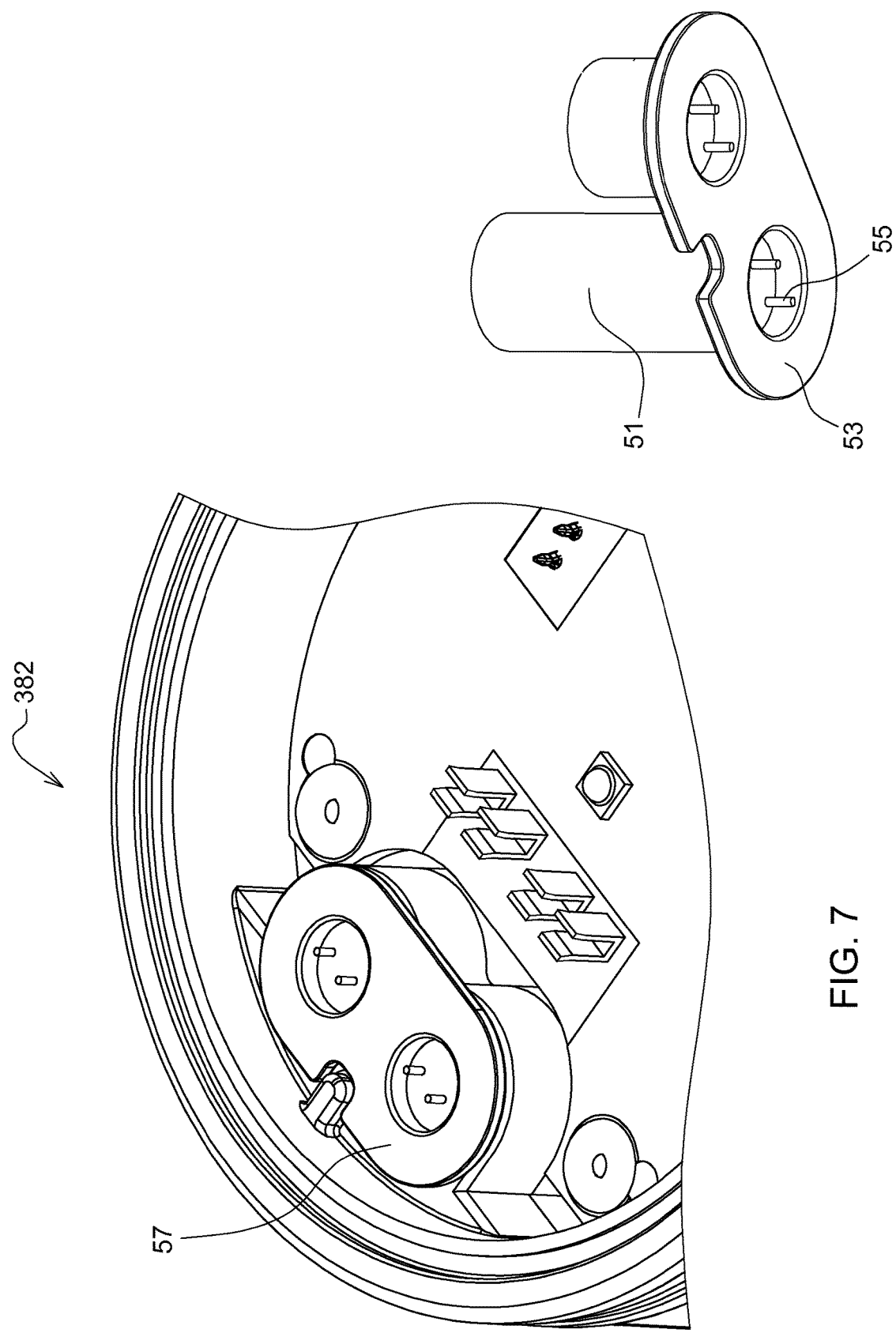
FIG. 7 depicts an example socket for thermistors.

In FIG. 4, there are example thermistors 50 located just below the release holes 346 and 344. The vertical height of the release holes 346 and 344 are different in order to mate to the horizontal channels that are aligned with an aperture (330A, 330B, 331) of an outlet 1-6. As such, the vertical location of the two thermistors 50 in the respective vertical connection ducts 342 and 340 are also asymmetric, as shown in FIG. 4. FIG. 6 depicts a magnified view of the thermistors 50 and an outer casing 51 holding the thermistors 50. Thermistors are at the top of the two columns in the casing 51. A bottom surface 53 forms a top cover to the chamber that contains the electronic circuits 382. The electrical leads 55 from the thermistors 50 are visible at the bottom surface 53. The electrical leads 55 plug into circuit sockets 57 in the printed circuit board for the electronic circuits 382, as shown in FIG. 7. In some embodiments, the thermistors 50 have an outer casing (overmolded) as depicted in FIG. 5d.

In FIG. 7, the outer casing 51 includes two towers that mate and fit into the vertical connection ducts 342 and 340. The two towers are welded (e.g. plastic welded ISO 472), injection welded, etc., to an interior lower surface of the respective connection ducts 342 and 340. As 3-D printing improves, this serves an alternative manufacturing method for the thermistor 50, casing 51 and the other parts of the interior of the nozzle turret 32. The material to manufacture the outer casing 51 includes moisture or water resistant material such as ceramic, semi-plastic, or polymer or other material that readily conducts heat for the thermistors 50 to perform its function (e.g. coolpoly elastomers that conduct heat but not electrical signals) but can still be tightly sealed or joined to a material of the nozzle 40 (e.g. plastic or polymers).

Figure 8:
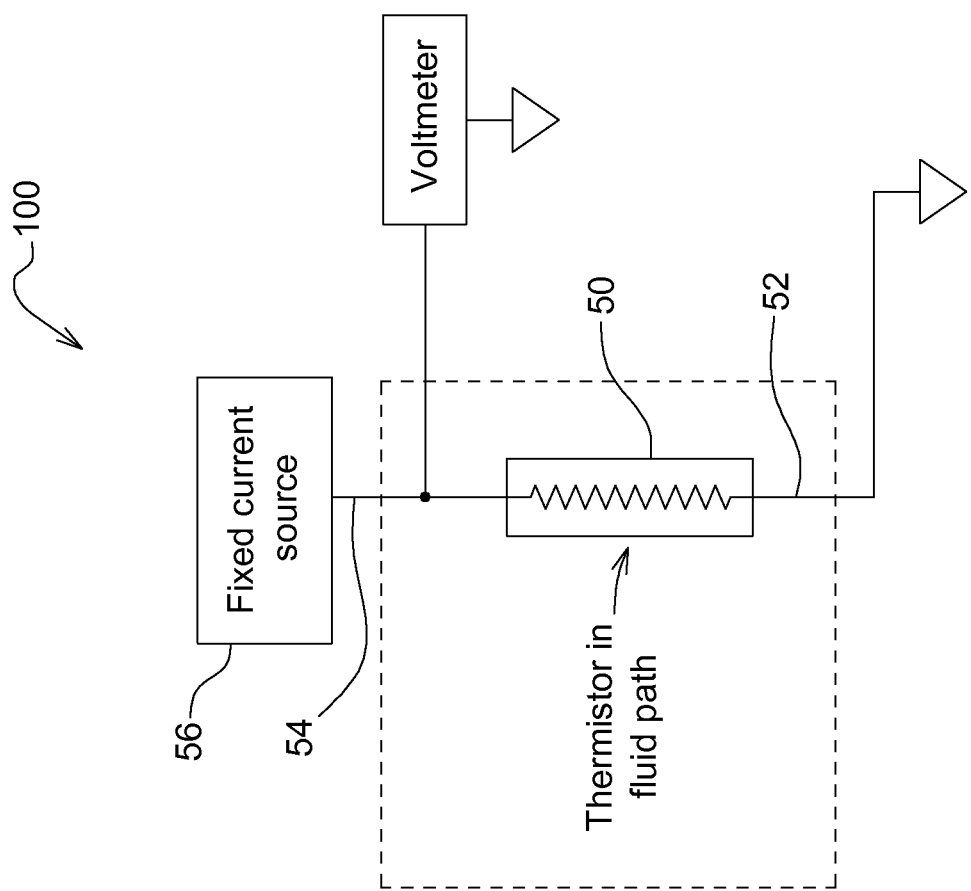
FIG. 8 depicts an example circuit to measure a voltage across a thermistor located in a fluid path.

FIG. 8 depicts an example electronic circuit embodiment to monitor the fluid flow characteristics to detect an obstruction or a partial obstruction or some other anomaly in the fluid flow. The thermistor 50 is placed in the fluid, but the end terminals 52 and 54 of thermistor 50 are electrically wired to circuits that are located elsewhere in the nozzle 40 or located remotely from the nozzle 40. Terminal 52 is electrically connected to ground or some other fixed reference. Terminal 54 is electrically coupled to a fixed current source 56 so that a substantially constant (e.g. to within 90%) current flows through thermistor 50. The voltage at terminal 54 is measured or the differential voltage across the thermistor 50 is measured by a voltmeter circuit. For example, the value of the voltage is received by an analog buffer and then digitized, and the digitized signals are sent to a digital processor circuit or logic unit to compute the resistance of the thermistor 50 and to infer the temperature of the fluid.

Figure 9:
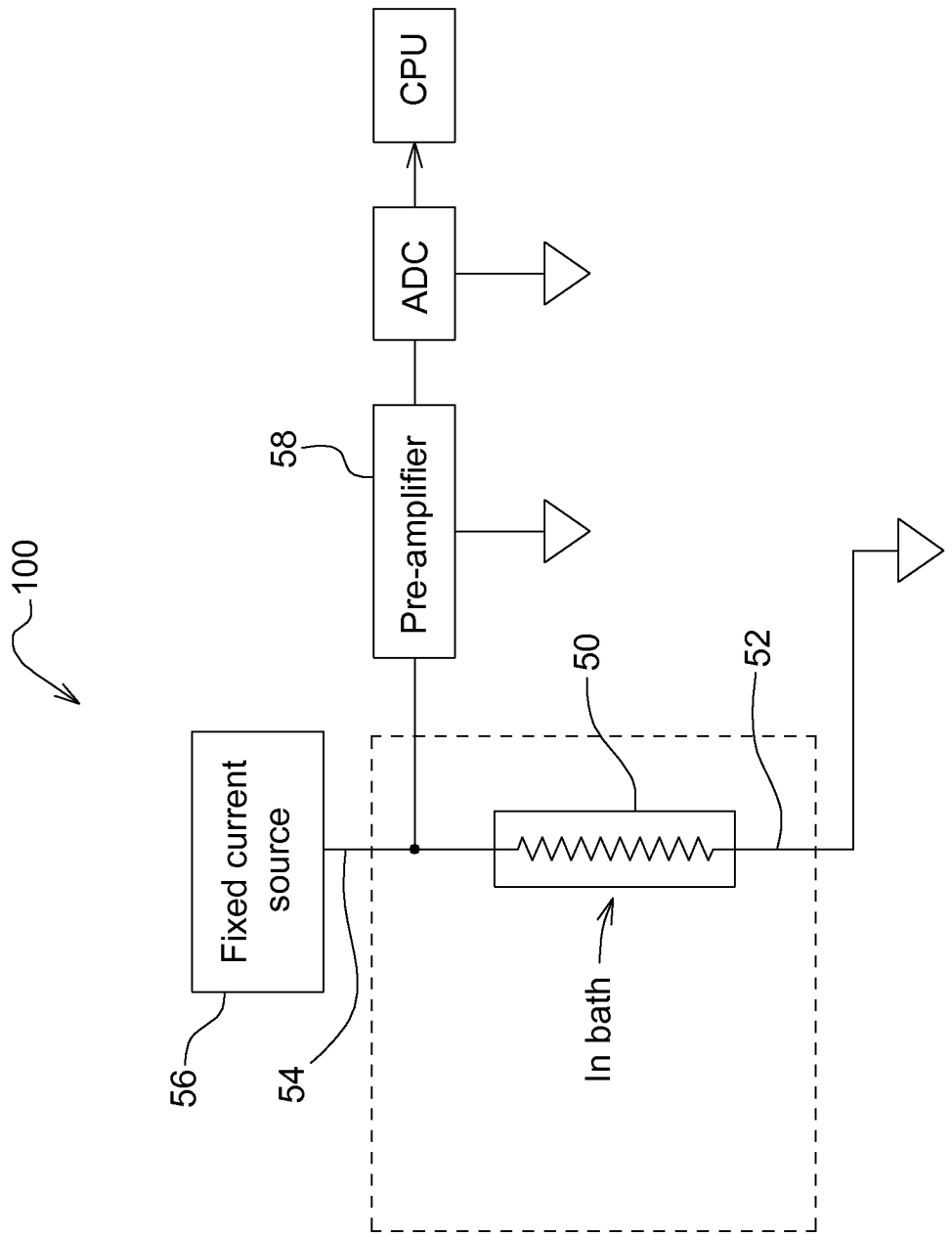
FIG. 9 depicts another example circuit to measure a voltage across a thermistor located in a fluid path.

FIG. 9 depicts another example electronic circuit embodiment to monitor the fluid flow characteristics. The voltmeter of FIG. 8 includes replacing it by a preamplifier 58 having a high impedance input so that the fixed current flows through the thermistor 50 and not to the preamplifier 58. The preamplifier 58 amplifies the voltage measured across the thermistor 50 and improves the signal to noise ratio. An analog to digital converter (ADC) converts the analog voltage from the preamplifier 58 to digital output bits for further processing by a processor or a computer that can calculate the resistance and temperature of the thermistor 50 and infer the temperature of the fluid.

Figure 10:
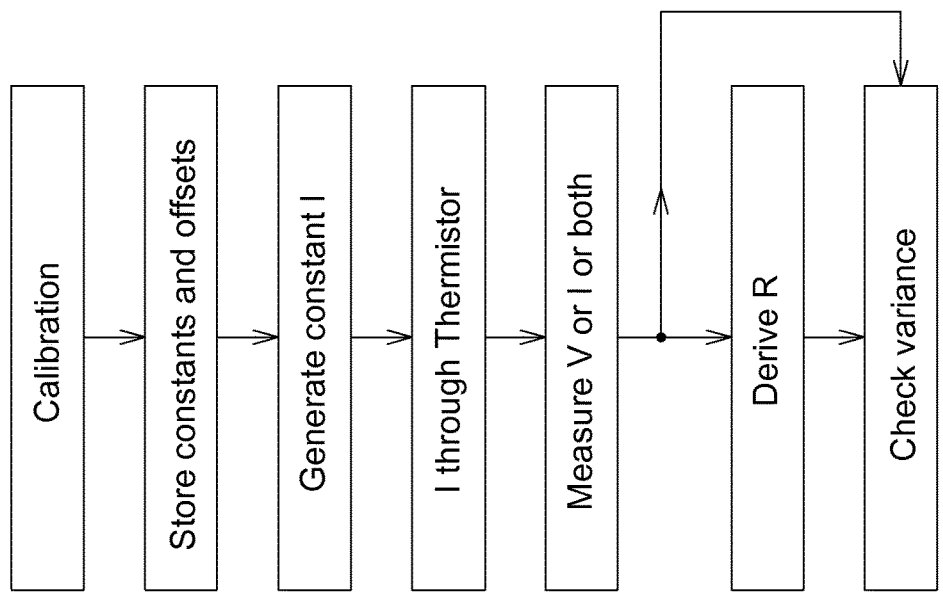
FIG. 10 depicts an example flowchart to measure a voltage, derive a thermistor resistance and/or to check variance.

Regarding the operation of FIGS. 8 and 9, FIG. 10 depicts a flowchart of an example method that provides a constant or known amount of electrical current I through the thermistor 50. The amount of electrical current I is selected in part to keep the thermistor 50 in the operational region and to avoid going past the thermistor's 50 maximum or minimum operating range ("railing"). While putting the substantially constant current through the thermistor 50, the voltage V is monitored across the thermistor 50, which then yields the resistance R value through Ohms law, $R=V/I$. Then the calculated R value leads to a determination of the temperature T for the given material, where temperature T and resistance R is related by, for example, the Steinhart equation.

There are multiple optional modes of operation. For example, it is also possible to measure the current I through thermistor 50 in addition to the voltage V across the thermistor. For instance, the current may be measured by a current sensing resistor. The current I and voltage V lead to a calculation of the instantaneous R value based on Ohms law, and then the temperature T is computed from the R value. Alternatively by using precision circuit elements, the current I is not measured but taken as constant. The circuit to generate current I is external to the flowing fluid and generates current I with temperature independent components (e.g. precision resistor) so that the current I remains constant to within 95% or 99% and thus may be taken as a fixed value in the calculations. In yet other modes of operation, calibrations are performed a priori and the constant current I and the performance of other circuitry are correlated with a known temperature (e.g. using a thermometer). Any deviations or offsets observed are stored in memory so that they may be taken into account during the calculations of the resistance and temperature values during regular operation, which can provide a more accurate estimate of the true temperature. In addition, calibration offsets reflect the manufacturing variations among the thermistors and other electronics positioned in the different nozzles; these types of manufacturing variation offsets are also stored. Before comparing the results from the different nozzles, the calibrated offsets are subtracted off from or taken into consideration to normalize the results among the different nozzles. When an abnormal value of temperature T is observed, a plug alert is generated. Alternatively, rather than calculating the temperature T, to determine anomalies among many nozzles, it is sometimes sufficient to monitor a variance among the different voltage V values when the same amount of current is fed to all of the respective nozzles' thermistors. Due to current conservation, the same amount of current may be sent to all the thermistors even over a long length of wiring. When an abnormal value of the voltage V is observed among the different nozzles, a plug alert is generated.

In an enclosed area such as inside a nozzle cavity, the heat generated by the thermistor may still build up even if there is fluid flowing. To avoid possible railing or overheating of the thermistor 50, the current I through the thermistor 50 is shut off, for example, at selected intervals or when the boom is raised or the vehicle slows or stops or makes a turn. If the fluid flow and nozzle valve actuation operate in a PWM mode, the release of current I may also be synchronized with the valve-actuation PWM signals. During the "OFF" periods of no current, the thermistor's 50 self-generated heat is then dissipated. Subsequently, current is again released to the thermistor 50 for a period of time, during which new measurements are taken again to detect a plugged or partially plugged condition.

Figure 11:
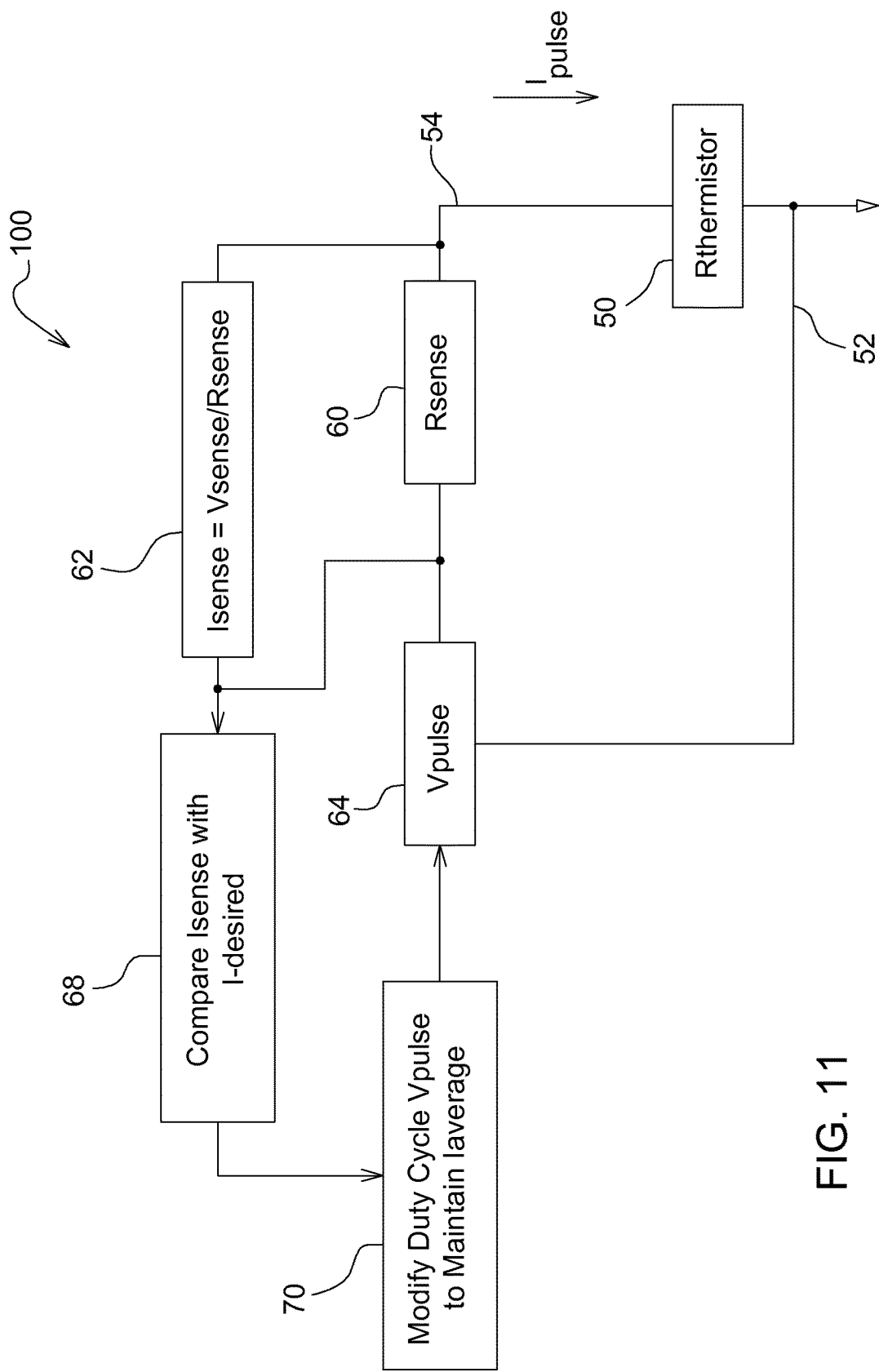
FIG. 11 depicts an example circuit to measure a current through a thermistor.
Figure 12A:
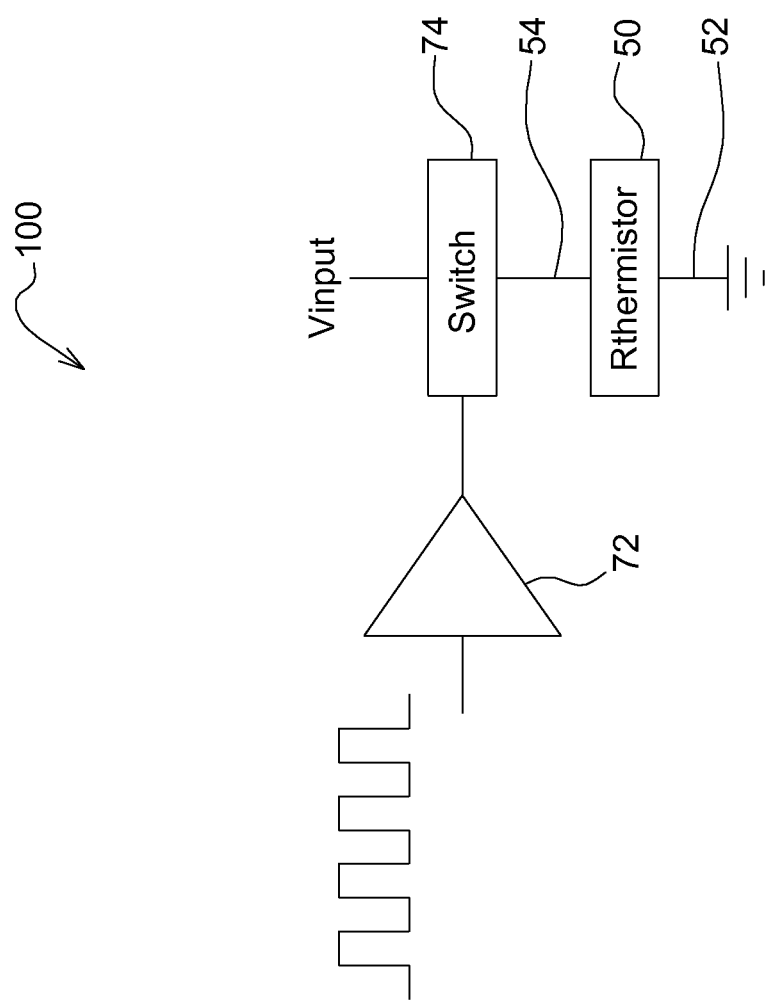
FIG. 12A depicts an example circuit to generate a voltage pulse across a thermistor.

FIG. 11 depicts an example circuit embodiment where a pulsed voltage Vpulse across thermistor 50 generates a current I-thermistor through the thermistor 50. The average magnitude of current I-thermistor is kept constant (to within 90-95%) due to the action of a feedback loop that modulates the pulse width of Vpulse across the thermistor 50's resistance as the resistance may change with temperature. It is also possible to keep the pulse width (or frequency) of Vpulse the same, but the amplitude is varied. Thermistor 50 is located in the fluid, but the rest of the circuits are external to the nozzle 40 or in a separate dry compartment within the nozzle 40. One terminal 52 of thermistor 50 is located at a reference voltage such as ground. The other terminal 54 of thermistor 50 is electrically connected to a current sense resistor R-sense 60. The other end of R-sense 60 is driven by the voltage pulse or a periodically-switched-in voltage V-pulse 64. A sensing block 62 is connected in parallel with R-sense 60 to measure the differential voltage across R-sense, in order to determine the current I-sense through R-sense 60 (and thus also current I-thermistor through thermistor 50). A comparator 68 is electrically connected to sensing block 62 to check whether current I-sense (or I-thermistor) is comparable to a desired current I-desired. Comparator 68 is connected to a modulator 70 that modifies either the duty cycle (PWM) or amplitude (PAM) of V-pulse. In implementation, the modulator 70, comparator 68, and other circuits include software and/or electronic circuitry. For example, the comparator 68 includes an analog current amplifier comparator, a current/voltage ramp and threshold detect, a digital circuit comparator, or a software comparison of the two values. As another example, V-pulse or PWM voltage 64 includes an implementation such as the one depicted in FIG. 12A, where a software processor or pulse generator sends a pulse signal to a buffer 72 that drives a switch 74 to electrically connect a voltage Vinput to the terminal 54 of thermistor 50. In FIG. 12A, the buffer 72 controls a switch 74 (e.g. MOSFET) that electrically connects or disconnects a Vinput (voltage supply) to terminal 54 of the thermistor 50. The other terminal of thermistor 50 is electrically connected to ground or to some other fixed reference voltage. The buffer 72 also includes current sensing to monitor a current going through the thermistor 50. For nozzles 40 that are operated under pulse width modulation (PWM) control to spray and release fluids, the PWM signal can also be used to drive and modulate the input of the buffer 72. The output of the buffer 72 is modulating a signal driving the gate of the MOSFET switch 74 to turn on or off the switch Y to connect or disconnect Vinput from thermistor 50. In this example, the switch 74 operates as a linear switch and passes Vinput and sources current to the load thermistor 50 when the MOSFET operational voltage values are met. If the MOSFET is an N-channel FET, the conditions for passing Vinput are $V_g-V_s>V_t$ and $V_{gs}-V_t>V_{ds}$, where $V_g$ is the gate voltage, $V_s$ is the source voltage, $V_{ds}$ is the voltage across the drain and source, and $V_t$ is the threshold voltage of the FET. The polarity is accordingly switched if the MOSFET is a P-channel FET, $V_s-V_g>V_t$; $V_{sg}-V_t>V_{sd}$.

In an example method of operating the pulsed mode circuit configuration in FIGS. 11 and/or 12A, the current I-pulse is maintained substantially constant to within 90-95% while the current through and voltage across thermistor 50 are monitored and measured. Because the current is a pulse, there are different ways to adjust it and still maintain a constant current. For instance, either the amplitude (I-avg over multiple pulses) and/or the duty cycle of I-pulse in thermistor 50 may be kept constant. However, the value of V-pulse (FIG. 11) or V-input (FIG. 12A) still varies because the resistance of thermistor 50 changes with temperature or other environmental changes based on Ohm's law; the voltage still changes because $V=I \times R$ even if the current may be kept constant. For example, if V-input is a battery whose voltage is switched to terminal 24, the value of V-input changes depending on the load on the battery. The current I-pulse or I-avg is sensed and measured by measuring a voltage across a sense resistor Rsense that is in series with the thermistor's resistance Rthermistor. The sensed current Isense should reflect the value of I-pulse, or an average of I-pulse (I-avg), that is passing through the thermistor 50. If the magnitude of I-avg is different from a desired value, the duty cycle of the V-pulse (FIG. 11) or the duty cycle to switch in V-input (FIG. 12A) is adjusted. The duty cycle may be adjusted up or down until the current through the thermistor 50 is returned to its desired value even when the temperature and Rthermistor change.

The temperature and variance among the results of the nozzles 40 are derived by the following example method. The sensed current reflects the amount of current through the thermistor 50 so that approximately, Isense=I-pulse=V-input/(Rsense+Rthermistor), without accounting for effects such as the switch's ON-resistance or wiring resistances. Alternatively, average values are computed, Isense=I-avg=average<V-input/(Rsense+Rthermistor)>. As the duty cycle of V-pulse or Vinput is adjusted, this looks like an apparent change (delta-V) in the voltage across the thermistor 50 or that delta-Rthermistor=delta-V/I-avg=delta-V/I-pulse. The change in temperature delta-T is obtained from delta-Rthermistor, using the Steinhart or tempco equations. The change in temperature or the present temperature T (e.g. calculated from delta-T and past temperature) is compared among the nozzles 40. Alternatively, if the amplitude of the current among the nozzles 40 is uniform, the variance among the nozzles 40 is determined from the variation in the duty cycle of V-pulse or V-input, or the variation in the average value of V-pulse or V-input.

In another example method of operating the pulsed mode circuit configuration in FIGS. 11 and/or 12A, the current I-pulse is again maintained substantially constant to within 90-95% while the current and voltage are monitored and sampled only when there is current flowing the thermistor 50 ("ON" mode). When the switch 74 is OFF, the signals are not sampled. In this case, Isense, Vinput are simply taken as constant values during the time period when switch 74 is ON. The sensed current Isense reflects the amount of current through the thermistor 50 so that approximately, Isense=V-input/(Rsense+Rthermistor), without accounting for effects such as the switch's ON-resistance or wiring resistances. Vinput varies as the resistance Rthermistor varies with temperature, which looks like an apparent change (delta-V) in the voltage across the thermistor 50 or that delta-Rthermistor=delta-V/I-sense. The change in temperature delta-T is obtained from delta-Rthermistor, using the Steinhart or tempco equations. The change in temperature or the present temperature T (e.g. calculated from delta-T and past temperature) is compared among the nozzles 40. Alternatively, the variance among the nozzles 40 is determined from the variation in the value of V-input.

Another example way to monitor for unexpected results is to make an initial calibration of the currents and voltage conditions in the nozzles 40 or when the nozzles 40 are known to be working properly. If the initial amount of current in the thermistor 50 is some value X at a particular amplitude of the voltage V-input, then any operational changes desired to maintain that amount of current X nearly constant (e.g. to within 95%) provides an indirect method of monitoring the temperature of the thermistor 50 and its surrounding fluid. Thus if V-input is initially set at a nominal pre-determined value, the current through thermistor 50 is measured by a sensing resistor to obtain Isense (e.g. 100 mA, 200 mA) through the thermistor 50. As the temperature rises or falls, the value of V-input to maintain Ifix at the calibrated value Isense also varies. That is, the varying value of V-input is correlated with the varying value of the temperature. But if any nozzle 40 has an unusually large varying value, this tends to indicate something is wrong with the nozzle.

FIGS. 11 and 12A may also be taken as an illustration of example electronic circuits having a thermistor 50 that includes an NTC power thermistor with a negative temperature coefficient that exhibits a large change in resistance corresponding to changes in the thermistor's body temperature. The thermistor 50 includes off-the-shelf devices. Alternatively, they are custom manufactured and stamped onto an interior surface of nozzle 40 near the inlet 34; the thermistor's material includes metallic oxides of manganese, nickel, cobalt, copper, iron and other metals. The thermistor material includes a mixture of two or more metallic oxides and a binder material; then it is pressed into a desired configuration such as one that matches the contours of the interior of the upper part of orifice 38. The resulting material may be sintered at elevated temperatures. By varying the types of oxides, the sintering time and temperature as well as the atmospheric gas, a thermistor 50 having a particular performance curve and resistance value can be manufactured that is appropriate for the fluids used in a specific application or for a range of agricultural crops.

Figure 12B:
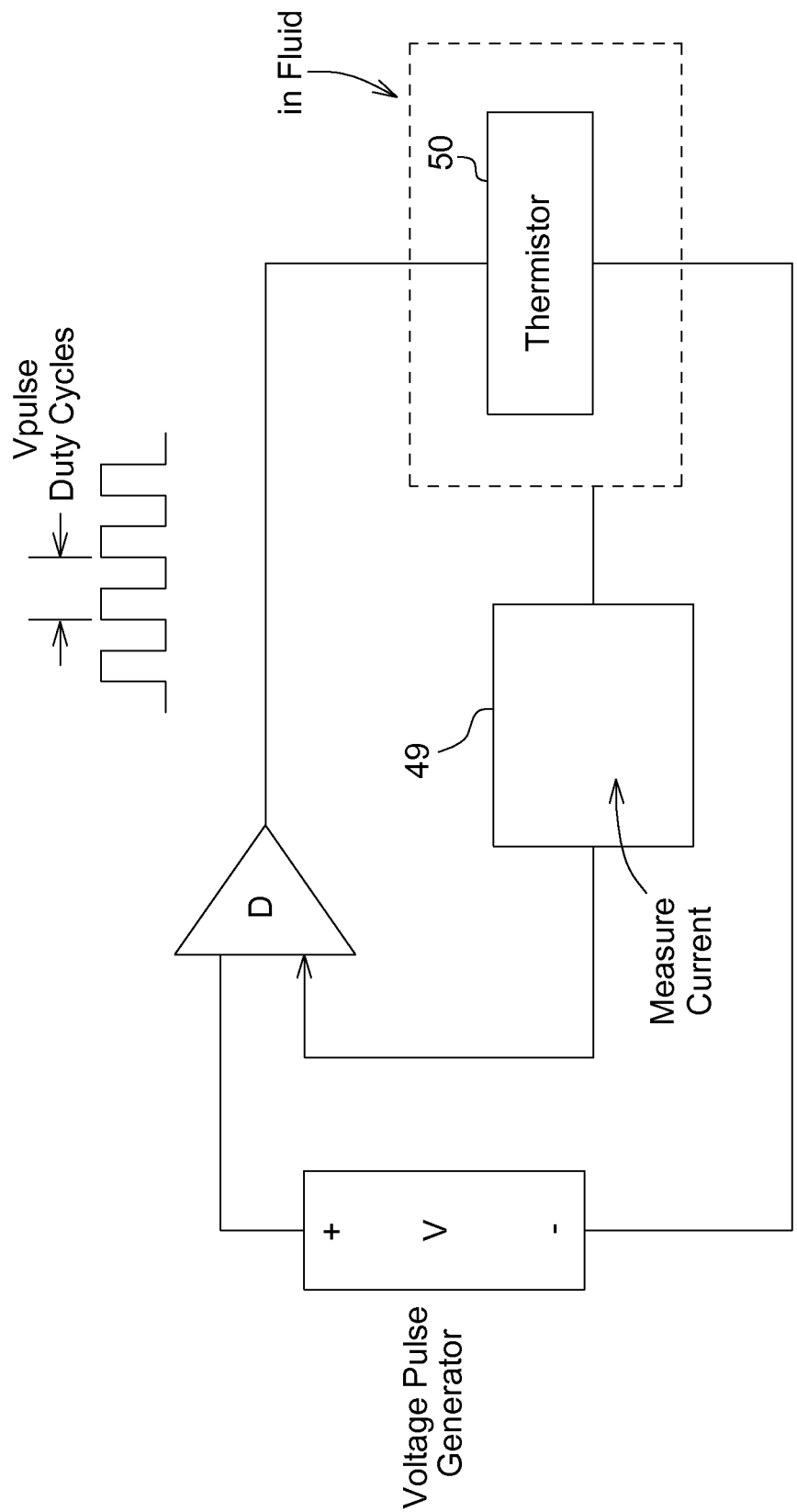
FIG. 12B depicts another example circuit to generate a voltage pulse across a thermistor.

FIG. 12B depicts another circuit embodiment to detect a rate of fluid flow or a plugged condition by detecting how difficult it is to maintain a constant average or root-mean-square (RMS) current Itarget in a temperature sensor (e.g. thermistor 50); alternatively, by comparing the variance among nozzles to maintain the constant average/RMS current, an operator can isolate a faulty nozzle. The average or RMS value of the current is with respect to time. FIG. 12B depicts a generalized circuit diagram where a voltage pulse Vpulse is generated across a thermistor 50 that is located in the path of the fluid. Vpulse is generated from a voltage pulse source, a switching power supply, or periodically switching in one or more different fixed voltages (e.g. Vinput of FIG. 12A). The amplitude of Vpulse is kept substantially constant (e.g. 90-95%); alternatively, even though the amplitude may vary, it varies substantially the same (to within 95%) for all the nozzles 40 having circuits operated from the same power source. The Vpulse generates a changing current (pulse) through each thermistor 50. Circuit block 49 measures an average current or a RMS current ("Iaverage") through the thermistor 50, such as by charging a capacitor or using a sense resistor Rsense and filtering the voltage across Rsense through an RC filter circuit. When Iaverage moves away from the target value Itarget, the duty cycle D of Vpulse is adjusted to try to move the thermistor current back to Itarget. When the temperature is too high (indicating a stagnant fluid condition) to maintain the current Iaverage at the Itarget value, the needed duty cycle D may go beyond a threshold value Do; then, a flow restriction is assumed (see FIG. 13B, upper right quadrant). Since there is a continuum of values for the duty cycle D, D also provides an indication of the flow rate, degree of plugged condition or the type of fluid flow restriction causing a change in resistance of the thermistor 50. Calibration or thermistor sampling is initially and/or continuously performed to determine an appropriate value of Do at a particular time or time period. By using precision calibration constants (e.g. difference in resistances for off-the-shelf thermistors or temperature sensors), and an empirically determined look-up table, it is possible to correlate the magnitude of the duty cycle D with stored constants to determine a more precise value of the flow rate for each nozzle 40.

Figure 13A:
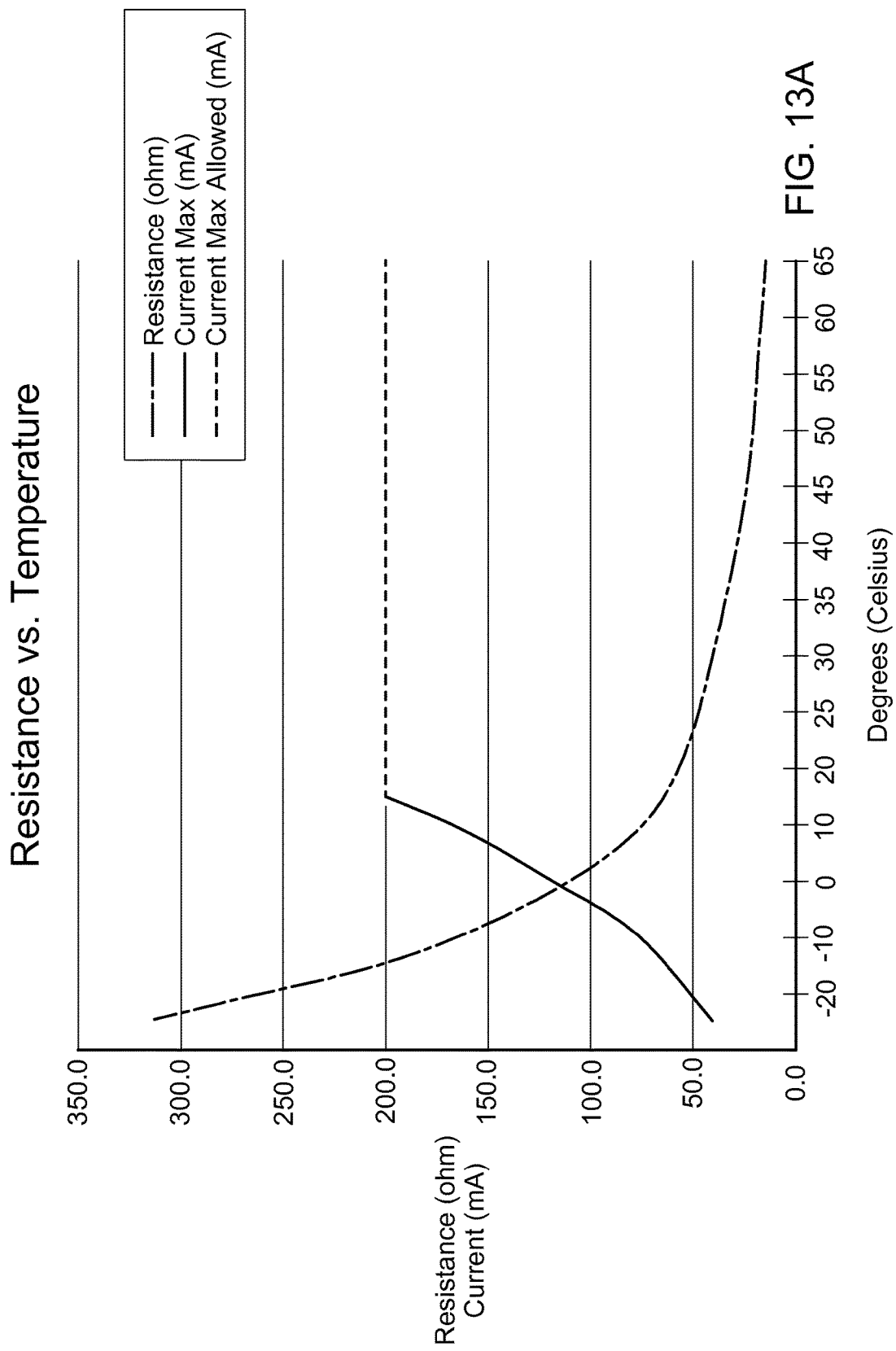
FIG. 13A depicts a performance graph of an example thermistor resistance and current versus temperature.

FIG. 13A depicts a performance graph of an example current versus temperature of a thermistor 50 such as those shown in FIGS. 8-12A. The current (in mA) through the thermistor 50 and the resistance (in Ohms) across the thermistor 50 are plotted on the y-axis as a function of temperature (in Celsius) of the thermistor on the x-axis. The resistance changes from about 300 Ohms to less than 10 Ohms between −20 to +60 degrees Celsius. Example thermistors include rods, beads, doped ceramics or semiconductors having either negative NTC or positive PTC coefficients. Different embodiments include thermistors with either positive or negative temperature coefficients. For agricultural applications, a temperature range of 0-20 degrees Celsius is often of most interest because the fluid is generally refrigerated or cooled. A suitable choice for a particular thermistor 50 depends on the types of fluids and operating temperature range of interest.

Figure 13B:
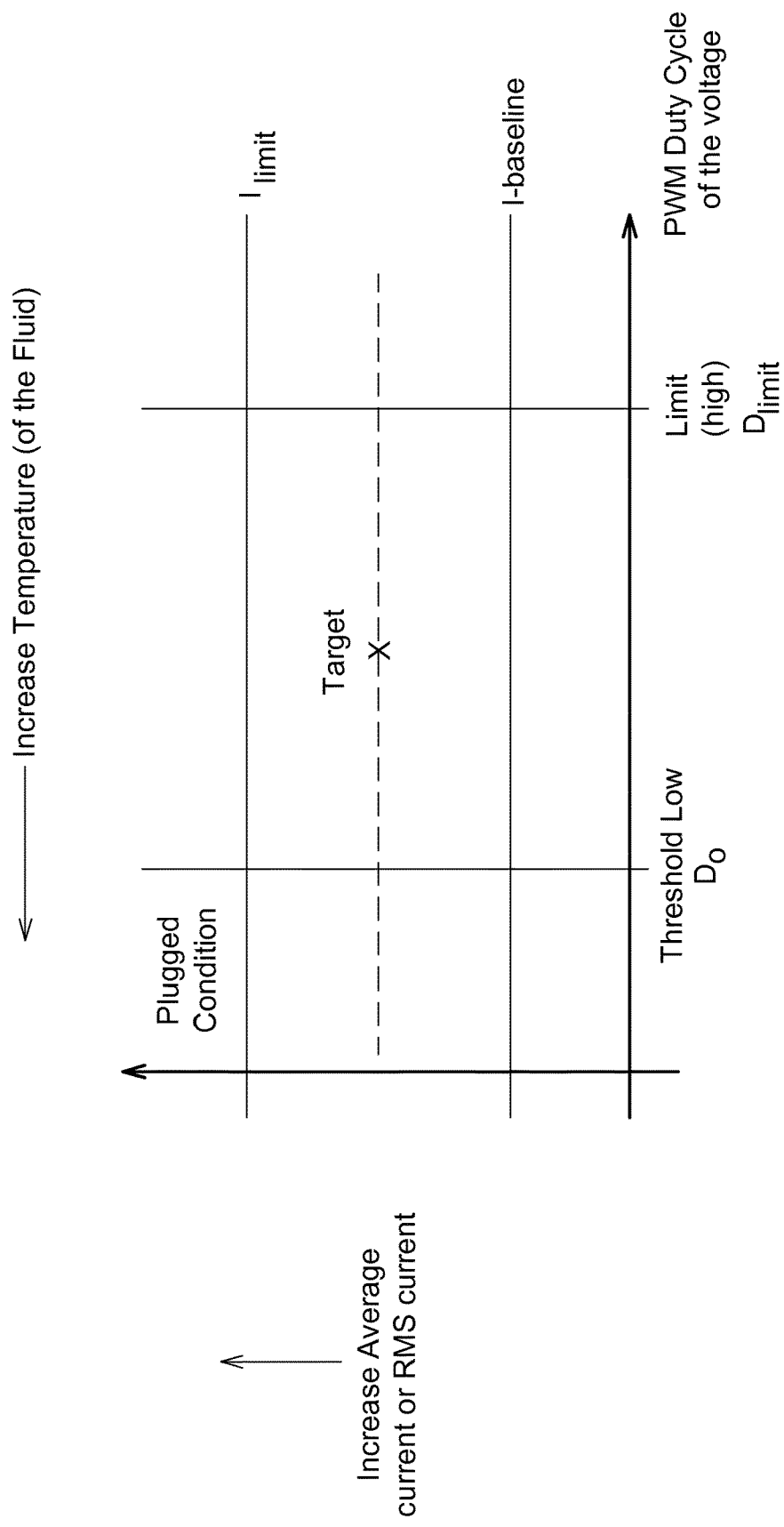
FIG. 13B depicts a performance graph of an example thermistor current versus voltage pulse duty cycle.

FIG. 13B depicts a graph showing example results of implementing a circuit such as the one in FIG. 12B in conjunction with the thermistor characteristics displayed in FIG. 13A. The polarity of the implementation (e.g. positive or negative, increasing or decreasing values) in the graph is arbitrary depending on the type of thermistor 50 or other temperature sensor. The x-axis represents the Vpulse duty cycle D; below a certain duty cycle, the fluid in a nozzle 40 is not flowing properly or something else may be wrong with the nozzle. The lower threshold Do is obtained by performing a calibration of the thermistors 50 such as during manufacturing or periodically during spray operation when the nozzles 40 are known to be flowing properly. For example, Do is the lowest duty cycle D that is obtained among all of the nozzles 40, and Dlimit is the highest duty cycle D among all of the nozzles 40, under a range of operating conditions (e.g. over all temperatures and fluid pressures). Other ways of setting Do and Dlimit include taking the 4-5 sigma values straddling the average duty cycle D. Yet other embodiments include using duty cycle D results from only selected nozzles from the full set of nozzles 40. Likewise, for the y-axis, which represents a current in the thermistor 50, a lower current (I-baseline) and upper current (I-limit) are obtained by sampling all the nozzle 40 thermistors 50 over a range of operating conditions.

A thermistor 50 in a properly operating nozzle 40 at room or outdoor temperature would operate with around a current value of Itarget, which is maintained by a particular duty cycle D between Do and Dlimit. The current through a thermistor 50 is maintained at substantially (90 or 95%) the value Itarget. But if the duty cycle D of Vpulse needed to maintain Itarget is below Do or above Dlimit, this indicates something in the nozzle is not working properly or the fluid is getting overly cold or hot. Then, if a nozzle 40 were operating in a region represented by the hashed quadrant in the graph of FIG. 13B, where the current in a thermistor 50 is past limit and the duty cycle of the PWM Vpulse is below Do, the fluid flow is assumed to have stopped in the nozzle or the nozzle is in a plugged condition. The graph of FIG. 13B may also be used to map or set up a fluid flow rate table for a nozzle 40; the exact values for the current versus duty cycle correlate with a flow rate. Additional variables such as flow pressure at a master section valve or flow pressure (pressure sensing at the membranes) for each nozzle 40 are added to the variables of graph of FIG. 13B to help make a more precise determination of the flow rate, expected droplet size, and so on.

In an example operation of a temperature sensor or thermistor 50 using the circuit FIG. 11, 12A or 12B, the Itarget might be 300 mA at a Vpulse duty cycle of 30% where the amplitude of Vpulse is fixed. As the temperature increases, the thermistor resistance decreases for a negative RTC. Based on Ohms law, I=V/R, the current in the thermistor 50 would increase as well since the amplitude of Vpulse is fixed. By reducing the duty cycle of Vpulse, the current would decrease back to its baseline target value, Itarget. However, if the temperature keeps increasing, at some point the duty cycle would reach its limit Do (e.g. FIG. 13B), a condition that indicates a flow restriction or other problem with the nozzle 40. The value of the instantaneous duty cycle and corresponding current may be used to gauge a degree of flow restriction or the flow rate.

Figure 14:
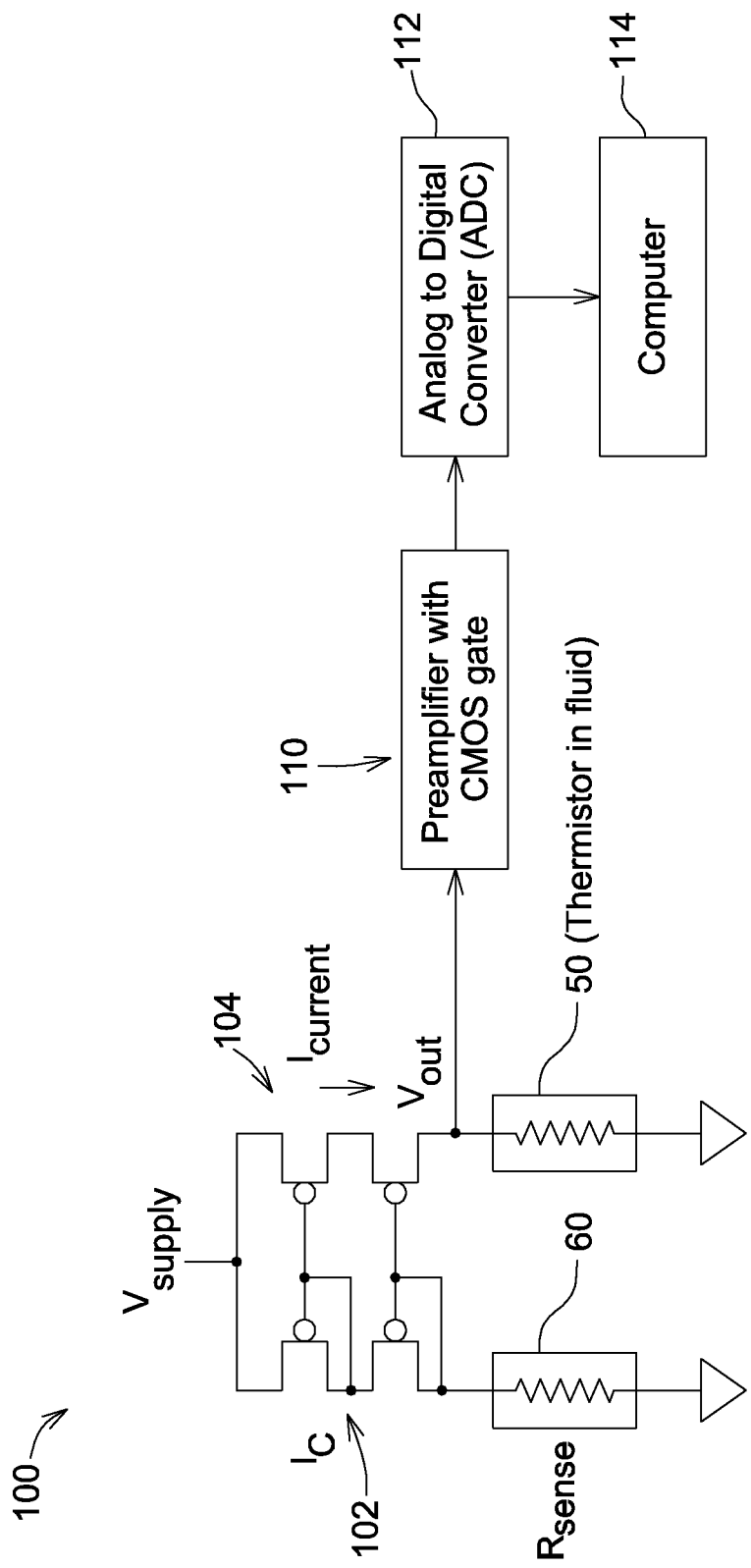
FIG. 14 depicts an example circuit to measure a voltage across a thermistor located in a fluid path.

It is also possible to implement several of the aforementioned circuit designs at a transistor level, for example, implemented as stamped electronics or flexible circuits that conform to a shape of a nozzle 40. FIG. 14 depicts an example transistor-level circuit 100 to generate a constant current through thermistor 50 and monitor changes in temperature using thermistor 50 that is located in the path of the fluid in a nozzle 40. Other than the thermistor 50, the rest of the circuit is located remote from and outside the fluid. Circuit 100 includes a current generator sourcing current Icurrent to the thermistor 50. Icurrent is generated by a current mirror circuit leg 102 formed by diode connected transistors mirrored to a stacked two or more levels cascoded transistors legs 102 and 104. The gate terminals of the respective diode (leg 102) and MOSFET (leg 104) are electrically connected. The cascode provides high impedance to generate a more constant current. To reduce variations the diode connected transistors (e.g. MOSFETS) bias a precision resistor Ro (e.g. 1%) or a resistor having similar or the same material as the thermistor 50. The voltage across the thermistor 50 is input to a high impedance (e.g. gate of MOSFET) input of a preamplifier with a gain of G. The output of preamplifier is G×Vout, which is digitized by an ADC and the output bits are sent to a processor. Anomalous values or changes in the product G×Vout that exceeds a pre-determined threshold is indicative of a possible problem in a nozzle 40. Alternatively, problems are detected based on a variance of the values of Vout or of (G×Vout) among the nozzles 40. Preliminary calibration is performed to take into account manufacturing variations in the precision resistor, the gain G, the transistors, or nozzles 40 due to their location on the boom or fluid distribution pipe (e.g. at the source of the fluid). If a temperature value is desired, the current Icurrent may also be monitored and measured using a sensing resistor in series with the precision resistor Ro so that the thermistor 50's resistance may be calculated from Rthermistor=Vout/Icurrent. Then the temperature is inferred from Rthermistor.

Figure 15:
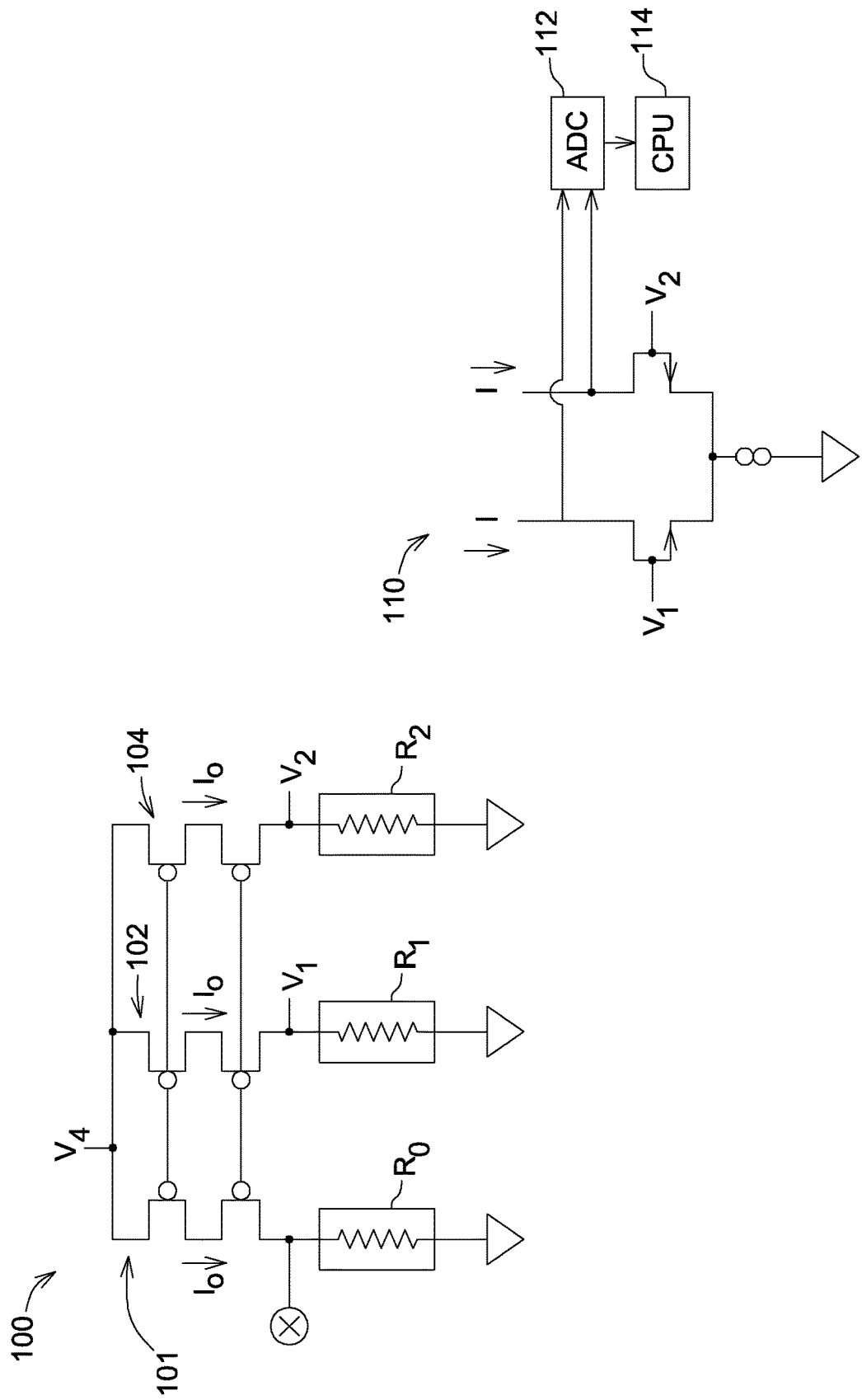
FIG. 15 depicts an example differential circuit to measure a voltage across a thermistor located in a fluid path.

FIG. 15 depict at least two possible circuit operations. In a first method, FIG. 15, depicts a distributed transistor-level circuit 100 to generate a constant current through thermistors 50 and monitor changes in temperature using thermistors 50 that is located in the path of the fluid in a nozzle 40. Other than the thermistors 50, the rest of the circuit is located remote from the nozzles 40 and outside the fluid path. Circuit legs 102, 104, and 106 are located at a central section controller for a group of nozzles. Legs 104 and 106 are electrically connected (e.g. via CAN-bus) to a corresponding thermistor 50 that is located in an individual nozzle 40. In FIG. 15, only two thermistors 50 are depicted, but the current mirror (i.e. legs 104, 106, etc.) can be replicated many times without appreciable performance degradation. Also the thermistors 50 are all nominally the same (although labeled R1 and R2 in FIG. 15). Circuit 100 includes a current generator sourcing current Icurrent to the thermistors 50. Icurrent is generated by a current mirror circuit leg 102 formed by diode connected transistors mirrored to a stacked two or more levels cascoded transistors legs 104 and 106. The gate terminals of the respective diode (leg 102) and MOSFET (legs 104, 106) are electrically connected. The cascode provides high impedance to generate a more constant current. To reduce variations the diode connected transistors bias a precision resistor Ro (e.g. 1%) or a resistor having similar or the same material as the thermistor 50. The voltage across each thermistor 50 is input to a high impedance (e.g. gate of MOSFET) input of a preamplifier (e.g. FIG. 14) with a gain of G. The output of preamplifier is G×Vout, which is digitized by an ADC and the output bits are sent to a processor. To reduce the amount of circuitry, a multiplexer can channel several preamplifier outputs as inputs to the ADC for sampling and digitization. Anomalous values or changes in the product G×Vout for each thermistor 50 (nozzle 40) that exceeds a pre-determined threshold is indicative of a possible problem in a particular nozzle 40. Alternatively, problems are detected based on a variance of the values of Vout or of (G×Vout) among the nozzles 40. Preliminary calibration is performed to take into account manufacturing variations in the precision resistor, the gain G, the transistors, or nozzles 40 due to their location on the boom or fluid distribution pipe (e.g. at the source of the fluid). If a temperature value is desired, the current Icurrent may also be monitored and measured using a sensing resistor in series with the precision resistor Ro so that the thermistor 50's resistance may be calculated from Rthermistor=Vout/Icurrent. Then the temperature is inferred from Rthermistor.

In a second method of operating the transistor circuit 100 in FIG. 15, differential signals from two thermistors 50 are sampled so as to cancel out ground bounce or other signal glitches and to improve the signal to noise ratio. FIG. 15, depicts a transistor-level circuit 100 to generate a constant current through two thermistors R1 and R2 and monitor changes in temperature based on the two thermistors R1 and R2 that are both located in the same path of the fluid in a nozzle 40. The value of the resistances of the two thermistors differs: e.g. R1 is much larger than R2. Other than the thermistors R1 and R2, the rest of the circuit is located remote from the fluid such as within a dry compartment in the nozzle 40 or outside of nozzle 40. Legs 104 and 106 are electrically connected to a corresponding thermistor R1 or R2. Circuit 100 includes a current generator sourcing current Icurrent to the thermistors R1 and R2. Icurrent is generated by a current mirror circuit leg 102 formed by diode connected transistors mirrored to a stacked two or more levels cascoded transistors circuit legs 104 and 106. The gate terminals of the respective diode (leg 102) and MOSFET (legs 104, 106) are electrically connected. The cascode provides high impedance to generate a more constant current. To reduce variations the diode connected transistors bias a precision resistor Ro (e.g. 1%) or a resistor having similar or the same material as the thermistors R1 and R2. The voltages V1 and V2 across each thermistor R1 and R2, respectively, are input to a high impedance (e.g. gate of MOSFET) input of a preamplifier or a differential amplifier 110 with a gain of G. The voltages are V1=Icurrent×R1; V2=Icurrent×R2. The output of the differential amplifier is Vout=G×(V1−V2), which is digitized by an ADC and the output bits are sent to a processor. Anomalous values or changes in the product Vout=G×(V1−V2) that exceeds a pre-determined threshold is indicative of a possible problem in a nozzle 40. Alternatively, problems are detected based on a variance of the values of Vout among each of the nozzles 40. Preliminary calibration is performed to take into account manufacturing variations in the precision resistor, the transistors, or nozzles 40 due to their location on the boom or fluid distribution pipe (e.g. at the source of the fluid). If a temperature value is desired, the current Icurrent may also be monitored and measured using a sensing resistor in series with the precision resistor Ro so that the thermistors' resistance R1 and R2 may be calculated from V1=Icurrent× V2=Icurrent×R2. If the transistors, or legs 104 and 106, differ due to manufacturing differences or due to layout differences, the current is substantially (e.g. 97-100%) the same through legs 104 and 106, but not necessarily identical. After obtaining the resistance values, the temperature is inferred from R1 or R2 or from a weighted average of R1 and R2.

Figure 16:
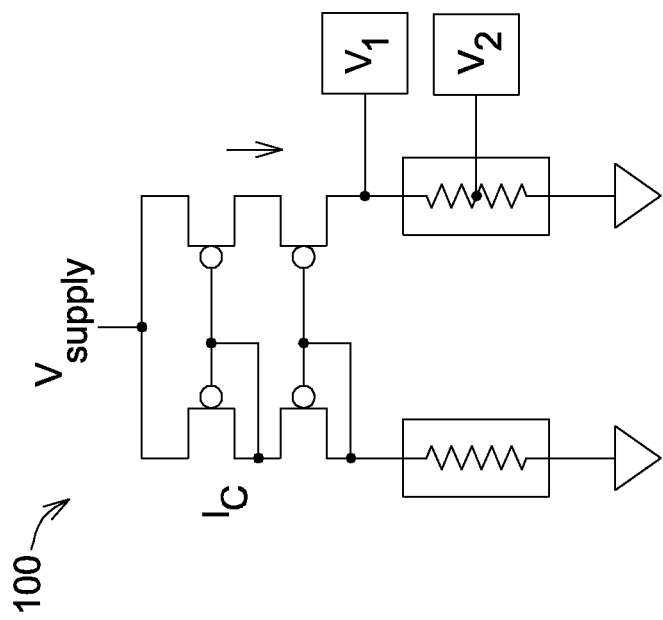
FIG. 16 depicts an example differential circuit to measure a voltage across a thermistor located in a fluid path.

FIG. 16 depicts an example circuit 100 where differential signals from two pick-off points of a single thermistor 50 are sampled so as to cancel out ground bounce or other signal glitches and to improve the signal to noise ratio. If the thermistor material is custom made or user-accessible, tapping off of two points in order to measure the voltage V1 and V2 at the two points is straightforward. Alternatively, if the thermistor 50 is an off-the-shelf device, there may not be a suitable access point other than the end terminals. Then two off-the-shelf thermistors electrically connected in series, can be used, but with their resistance values being different, such as R1=10×R2. For better matching, the two thermistor devices should have the same packaging and parasitic elements so that they track either in characteristics and performance. Otherwise the rest (differential amplifier, etc.) of the circuit 100 in FIG. 16 is similar to that in FIG. 15. The two pickoff points are akin to R1 and R2 in FIG. 15. In FIG. 16, R1 includes the entire resistance of thermistor 50; R2 includes only part of the resistance of thermistor 50. For example, R1=10×R2. And the resistances are obtained from the equations, V1=Icurrent×R1; V2=Icurrent×R2. Because the thermistors R1 and R2 are connected in series, the same current flows through each thermistor. The current Icurrent can be measured using a sensing resistor in leg 102. After obtaining the resistance values R1 and R2, the temperatures T1 and T2 are inferred from R1 or R2, respectively, or from a weighted average of R1 and R2. Variance among nozzles 40 is detected by monitoring V1 and V2; or monitoring R1 and R2 or T1 and T2 if the magnitude of Icurrent is measured.

As a generalization of some of the aforementioned situations such as when there is a large amount of fluid flowing past a thermistor 50 or temperature sensor or when the fluid is expected to remain in a sufficiently cold temperature range, the thermistor does not have time to overheat even when a current runs through it because the thermistor is cooled by the surrounding fluid. In this scenario, some of the aforementioned embodiments include providing a constant or known amount of electrical current I through a thermistor, monitor the voltage V across the thermistor, which then yields the resistance R value through Ohms law, R=V/I. The R value then leads to a determination of the temperature T for the given material. To obtain a more precise determination, it is often useful to measure both the current I and voltage V simultaneously and then calculate the instantaneous R value, and then calculate the temperature T from the R value. When an abnormal value of temperature T is observed, a plug alert is generated. Alternatively, to determine anomalies among many nozzles, it is sometimes sufficient to monitor a variance among the different V values when the same amount of current is presented to each of the nozzle thermistors, without having to calculate the value of temperature T. Through current conservation, the same amount of current may be provided to each of the thermistors even over a long length of wiring.

Sometimes, such as when there is not much fluid flow to be akin to a constant (cool) temperature bath or a thermistor material is such that it overheats rapidly, some embodiments include passing a pulsed current (On/Off) through the thermistor. It is also possible to pulse a current through the thermistor even when there is a large quantity of fluid or fluid flow. Pulsing the current (i.e. shutting it down periodically) keeps the thermistor cooler or in the operating range. Likewise, if there is a clog and the amount of stagnant fluid is small, pulsing the current through a thermistor tends to prevent the thermistor from being overheated. But if there is stagnant fluid, the thermistor still heats up itself and the stagnant fluid, but does not overheat to a point of destruction. That is, depending on the arbitrarily selected polarity, the thermistor heats when current passes through it and it cools back down when no current is flowing through it. Thus, the thermistor does not overheat and become damaged regardless whether there is fluid flowing or there is stagnant fluid, but the thermistor would ideally register a different characteristic value for flowing versus stagnant conditions. In some embodiments, the pulsed current I is averaged over time to determine a current level. Likewise, the voltage sourcing (or sinking) the current is measured so that an average resistance is calculated ($R_{average}=V_{average}/I_{average}$), and a temperature $T_{average}$ is subsequently calculated from the average resistance $R_{average}$. As an alternative, the instantaneous values are used in a calculation of $R_{average}$ such that ($R_{average}$=average<$V_{instant}/I_{instant}$>). When an abnormal value of temperature $T_{average}$ is observed, a plug alert is generated. Alternatively, to determine anomalies among many nozzles, it is sometimes sufficient to monitor a variance among the different $R_{average}$ values, without having to calculate the value of temperature $T_{average}$.

In other embodiments, regardless whether the current through the thermistor is pulsed or steady, the magnitude of the current is maintained at a fixed or substantially (e.g. to within 90-95%) fixed value. By maintaining the magnitude of the current, then the measured voltage (no pulsing mode) or the average of the measured voltage (pulsed mode), provides an indication of the temperature of the thermistor and its surrounding fluid. For example, now, calculated $R=V_{measured}/I_{fixed}$ in the non-pulsed mode and (calculated $R_{average}$=average<$V_{instant}/I_{fixed}$>) in the pulsed mode; and the temperature is inferred from R and $R_{average}$. Then again monitoring a variance among the values obtained for the different nozzles provides an indication of anomalous behavior. Alternatively, a magnitude of the temperature is calculated by using the Steinhart or temperature coefficient equations from the calculated values of R or $R_{average}$. More accurate estimates of the temperature are obtained by performing calibrations or making an initial baseline measurement and storing the values or offsets or differential values among the different nozzles in memory and later subtracting out or taking into account the offsets in the calculations for the final estimated temperature.

Any combination of the multiple aforementioned methods of monitoring the current through and voltage across thermistor 50 are sometimes also utilized to determine the change in temperature and/or indications of an anomalous nozzle 40 (e.g. the valves are not working properly, the nozzle is cracked). Pre-determined criteria set the threshold for anomalous behavior. For example, when an individual reading is past a threshold value or a series of threshold values for the measured current, or when an individual reading is multiple (e.g. 4) standard deviations different from the other readings. The pre-determined criteria are based on initial calibration of the thermistors 50 and associated circuits for each nozzle. Alternatively or in conjunction, a reference thermistor is placed at a section controller and its properties are measured. The results from individual nozzle thermistors 50 are compared against the results of the reference thermistor.

Further, there are other ways of measuring current other than using a sense resistor. A battery or similar voltage source can be used to provide a voltage to the thermistor 50. The current drawn by the battery is comparable to the current going through thermistor 50 (e.g. FIG. 12A). Battery units or voltage sources sometimes have a current indicator along with a reading of the voltage being supplied. The instantaneous values may be read out by the section or central controller to determine the amount of current going to the thermistor 50 of each nozzle 40. Another way to determine the current is charge a capacitor for a particular time period. As the voltage V passes a pre-determined threshold value in that same time period, this is indicative of the amount of current since $Q=C \times V$, or $dQ/dt=C \times dV/dt$, where Q is charge and $dQ/dt$=current. A replica of the Vpulse is also generated and provided to a capacitor C circuit to detect a magnitude of the current going to the thermistor due to Vpulse.

Figure 17:
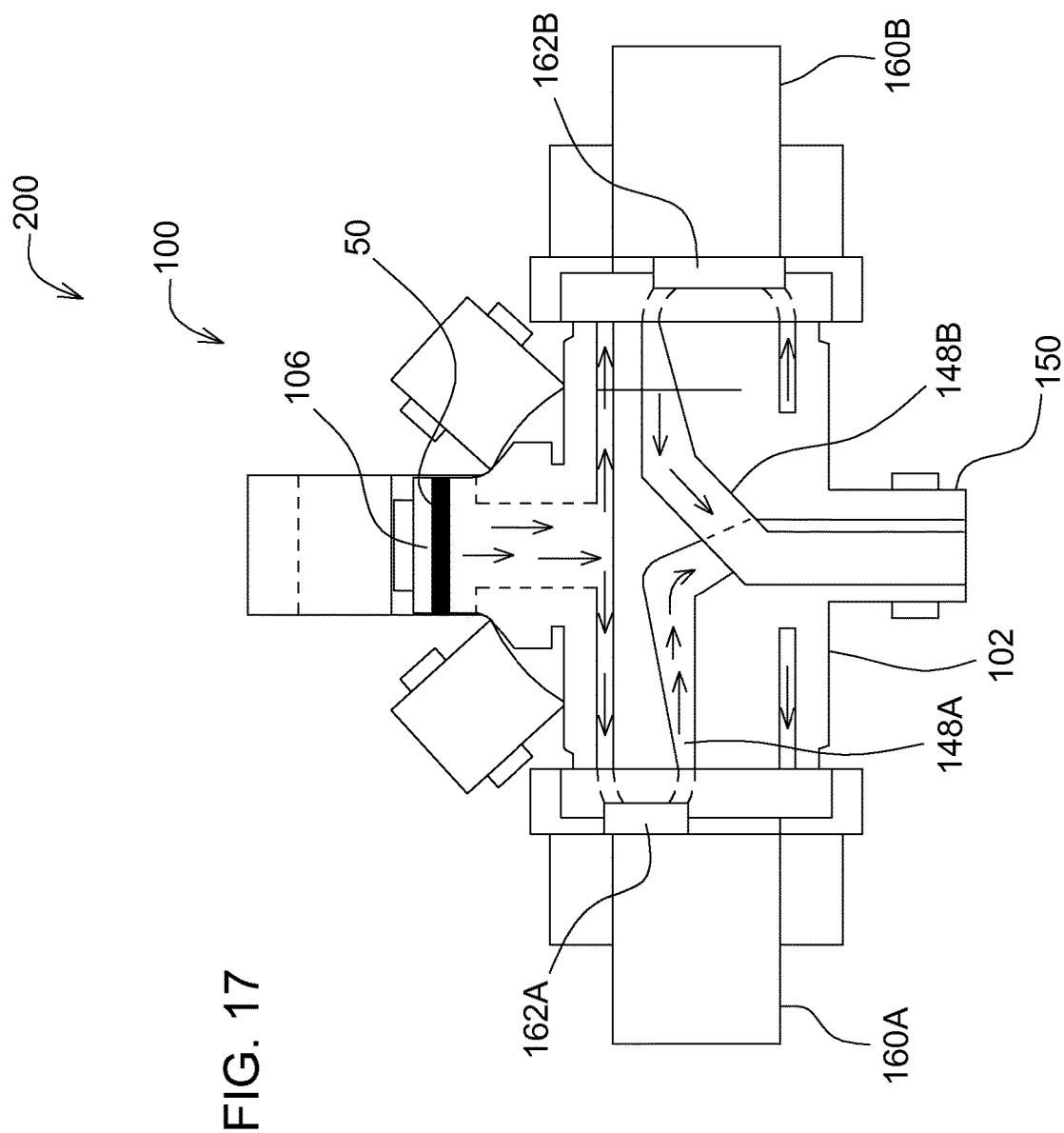
FIG. 17 depicts an example of an input section of a nozzle having a fluid flow sensor and optional strainer.

FIG. 17 depicts another example nozzle 200 where a fluid flow sensor or thermistor 50 is placed in an orifice 147 that is tubular. An optional strainer or membrane is located underneath the sensor or thermistor 50. The optional sieve or membrane straddles across orifice 147 (e.g. like thermistor 50). The member is in contact with a pressure transducer to check the pressure or vibration across the membrane or strainer. Orifice 147 empties into a space between concentric cylindrical walls of nozzle tube formed by 160A and 160B. The valves 162A and 162B either block or allow fluid flow. The valves are controlled by pulse-width modulated signals. The fluid can flow to one of multiple outlets as described in U.S. patent application Ser. No. 14/506,057, HYBRID FLOW NOZZLE AND CONTROL SYSTEM, that is incorporated by reference herein.

Figure 18:
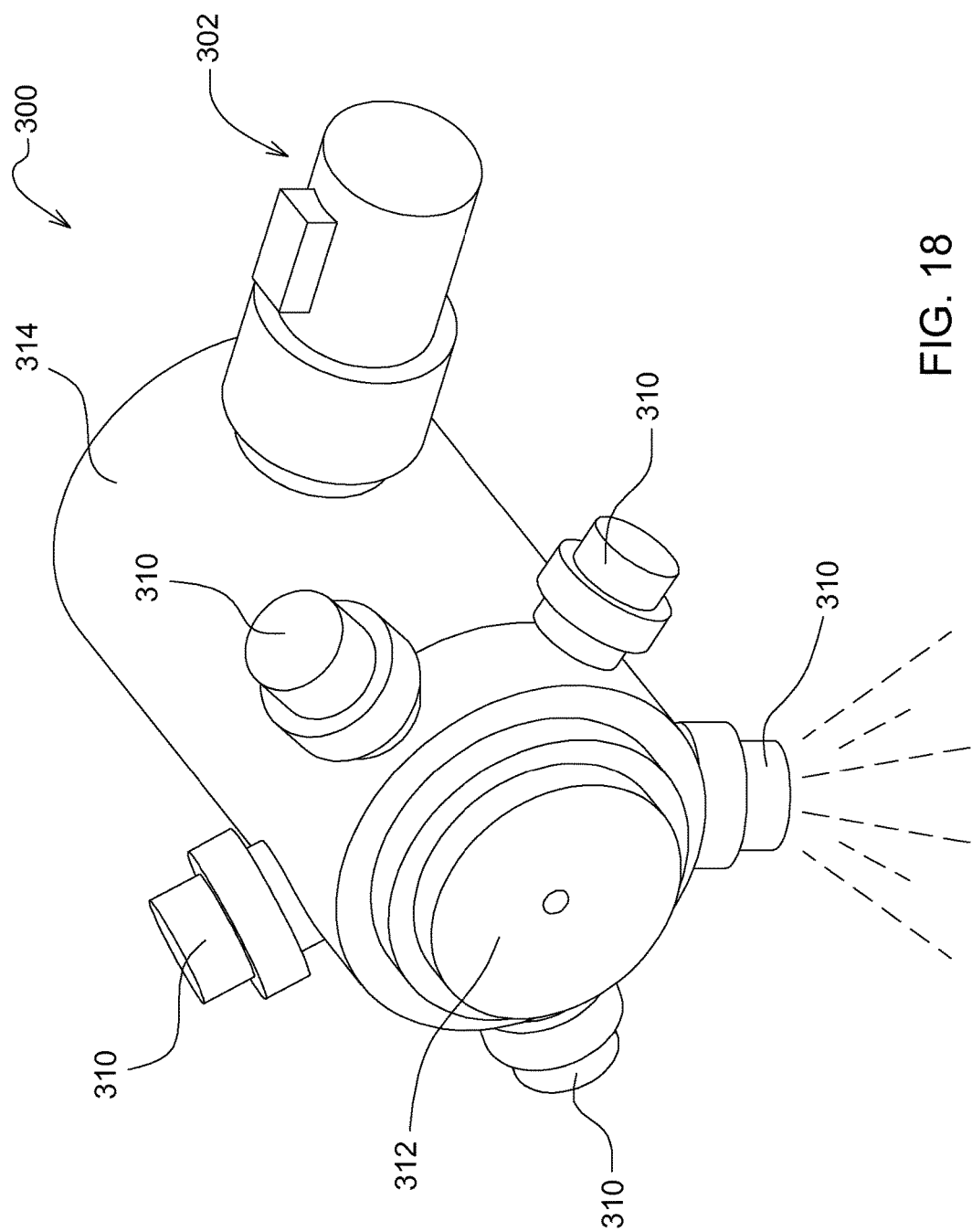
FIG. 18 depicts an example of a multi-head nozzle having a fluid flow sensor and optional strainer.

FIG. 18 depicts an example of a multi-head nozzle 300 having a fluid flow sensor and optional strainer. A thermistor 50 is placed in an orifice located behind the center cap. The distribution pipe ring is not shown but the fluid flows into 314. Only one of the five nozzle outlets 310 releases fluid, depending on the rotational position of the turret. Near the fluid inlet, there is an optional strainer or membrane in the orifice (past the valve) that catches undesirable particles. When the turret is rotated to a position such that none of the outlets 310 point directly downward, and there is no fluid flowing out, the boom (on which the fluid pipe and nozzles are mounted) may be rotated so that nozzle 300 is sufficiently upside-down, in order to flush empty or dump the sieve trapped particles out the check valve 302. The tubular boom is rotatable due to the way the inner wing of the boom is mounted (e.g. step motor) to a center frame of the sprayer vehicle.

Figure 19:
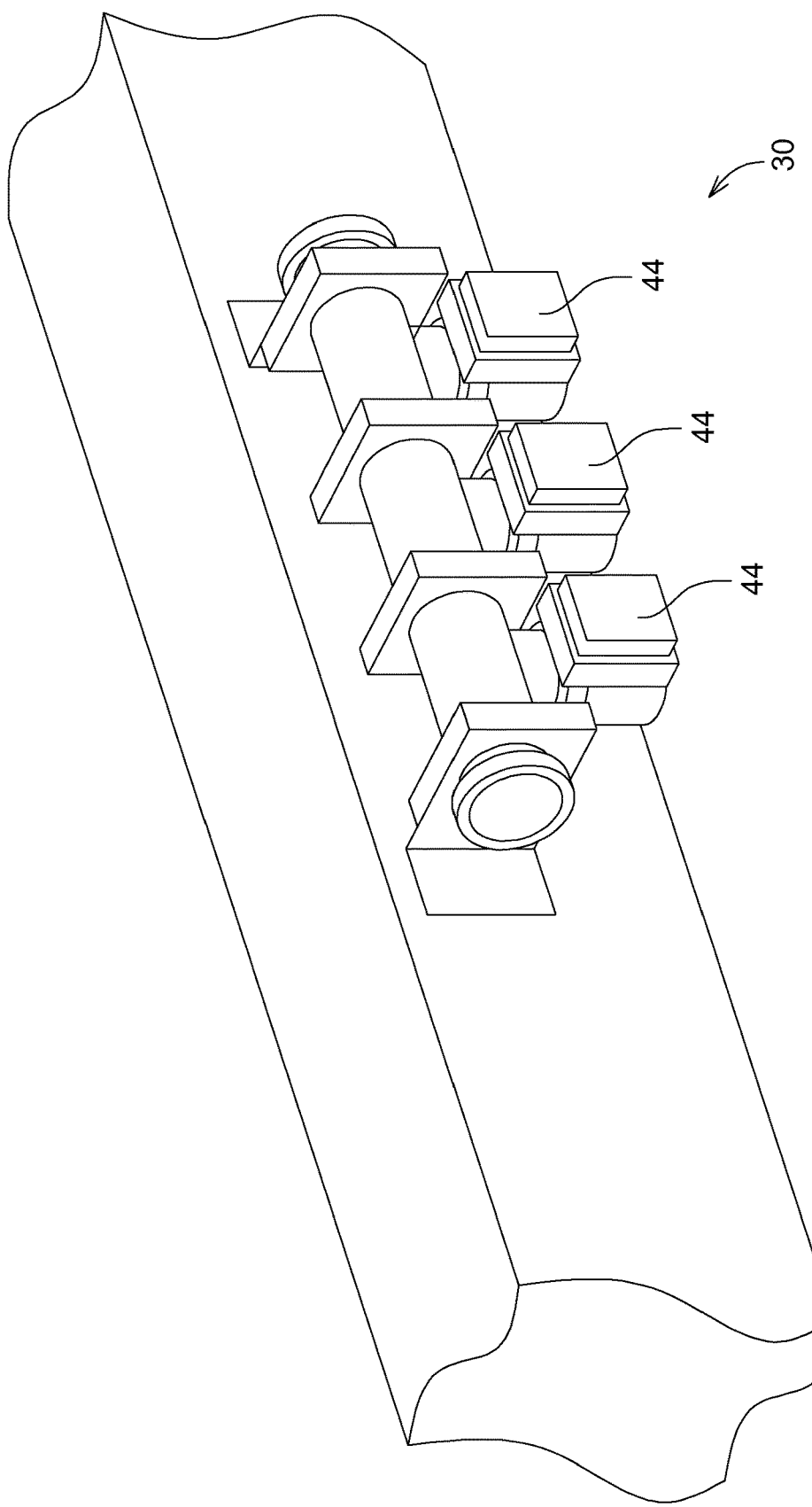
FIG. 19 depicts an example of a boom section valves having a fluid flow sensor.

The aforementioned fluid flow sensors are placed in individual nozzles 40. Similar sensors or thermistors 50 can also be located in the devices that source the fluid. For instance, FIG. 19 depicts an example of a boom 30 with section valves 44 having a fluid flow sensor mounted within the valves. Because the orifices are larger in a boom section valve 44, additional flow devices such as pressure sensors or motion detectors are also located there.

Figure 20:
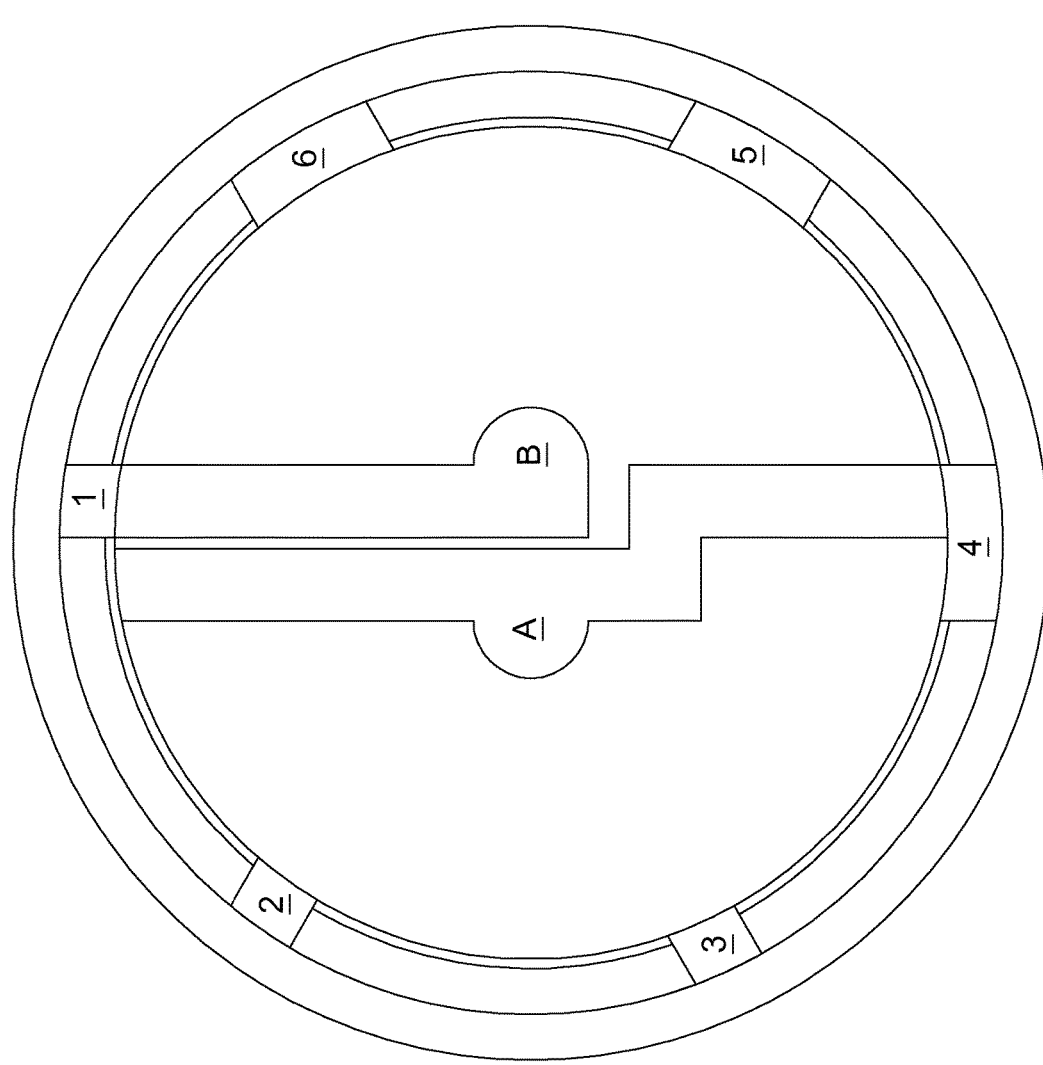
FIG. 20 depicts an example of a nozzle rotated to a position where fluid flows to two outputs.
Figure 21:
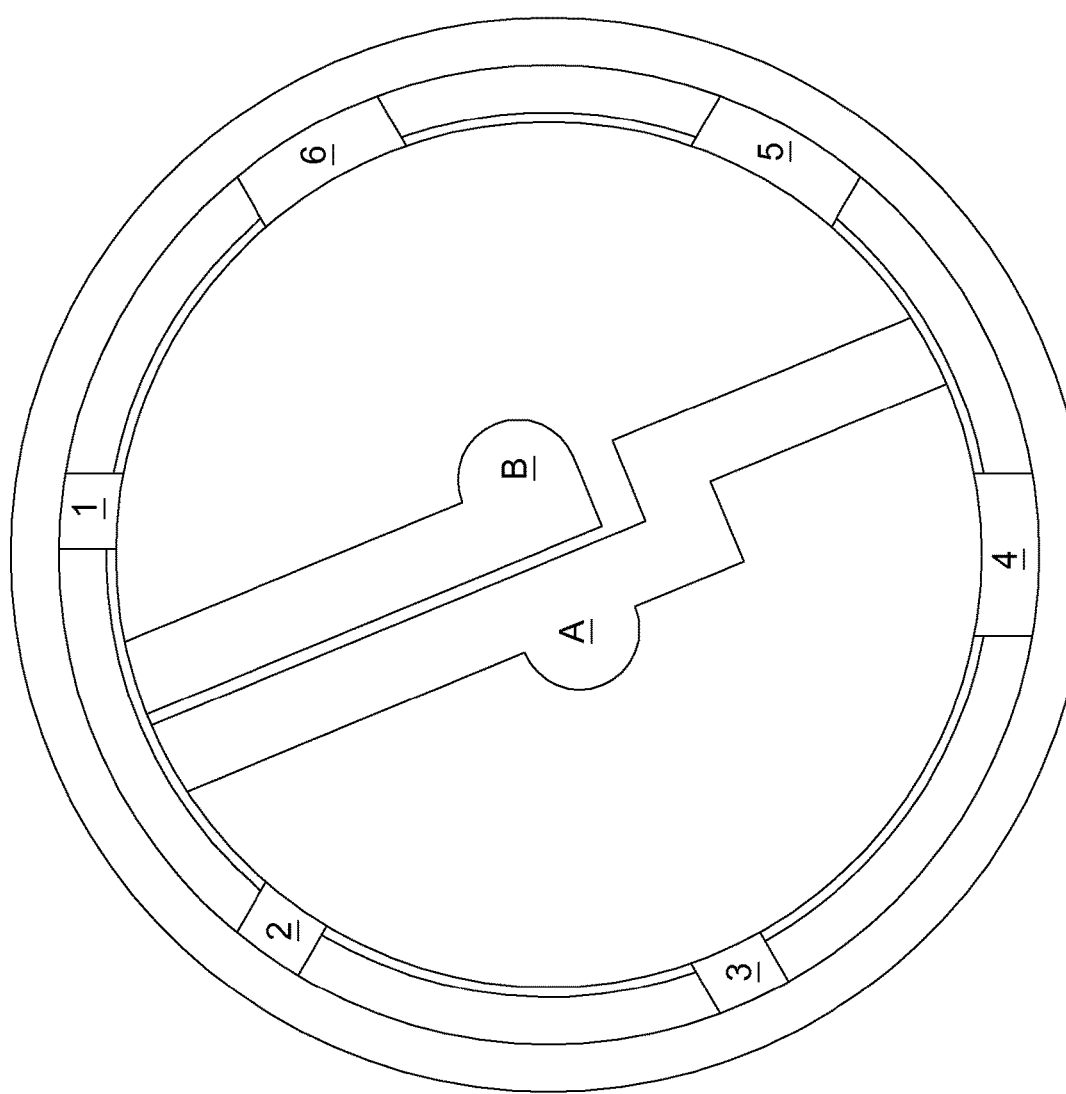
FIG. 21 depicts an example of a nozzle rotated to a position where fluid does not flow to any outputs. This position helps an operator to eliminate a nozzle clog.

FIG. 20 depicts an example of a nozzle rotated to a position where fluid flows to two outputs. FIG. 21 depicts an example of a nozzle rotated to a position where fluid does not flow to any nozzle output tips. This position of FIG. 21 helps an operator to eliminate a nozzle clog. Because no fluid is released out of any nozzle tip, the remaining fluid and particles are discarded by turning the nozzles 40 upsidedown or the boom upside down or in a direction such that the trapped particles can be expelled. For example, the trapped particles are expelled out of check valve 302. The direction of the fluid flow is reversed and released out of the check valve 302.

Figure 22:
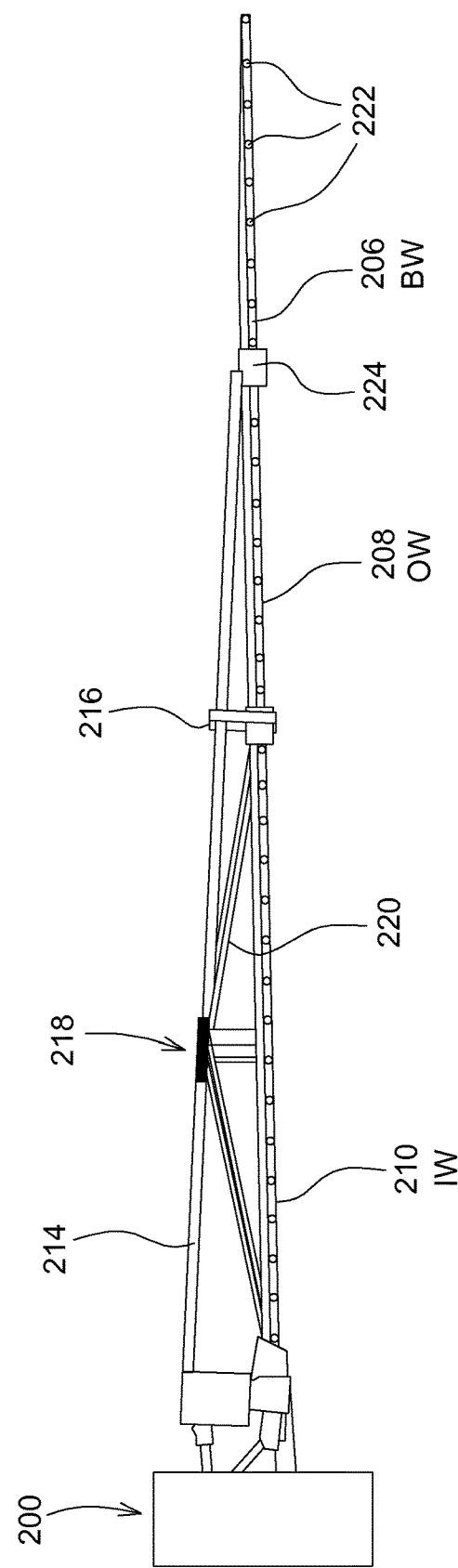
FIG. 22 depicts an example of a suspension lightweight fiber boom, behind which are nozzles having fluid flow sensors. The electronic signal wiring is routed in the hollow of the tubular boom.
Figure 23:
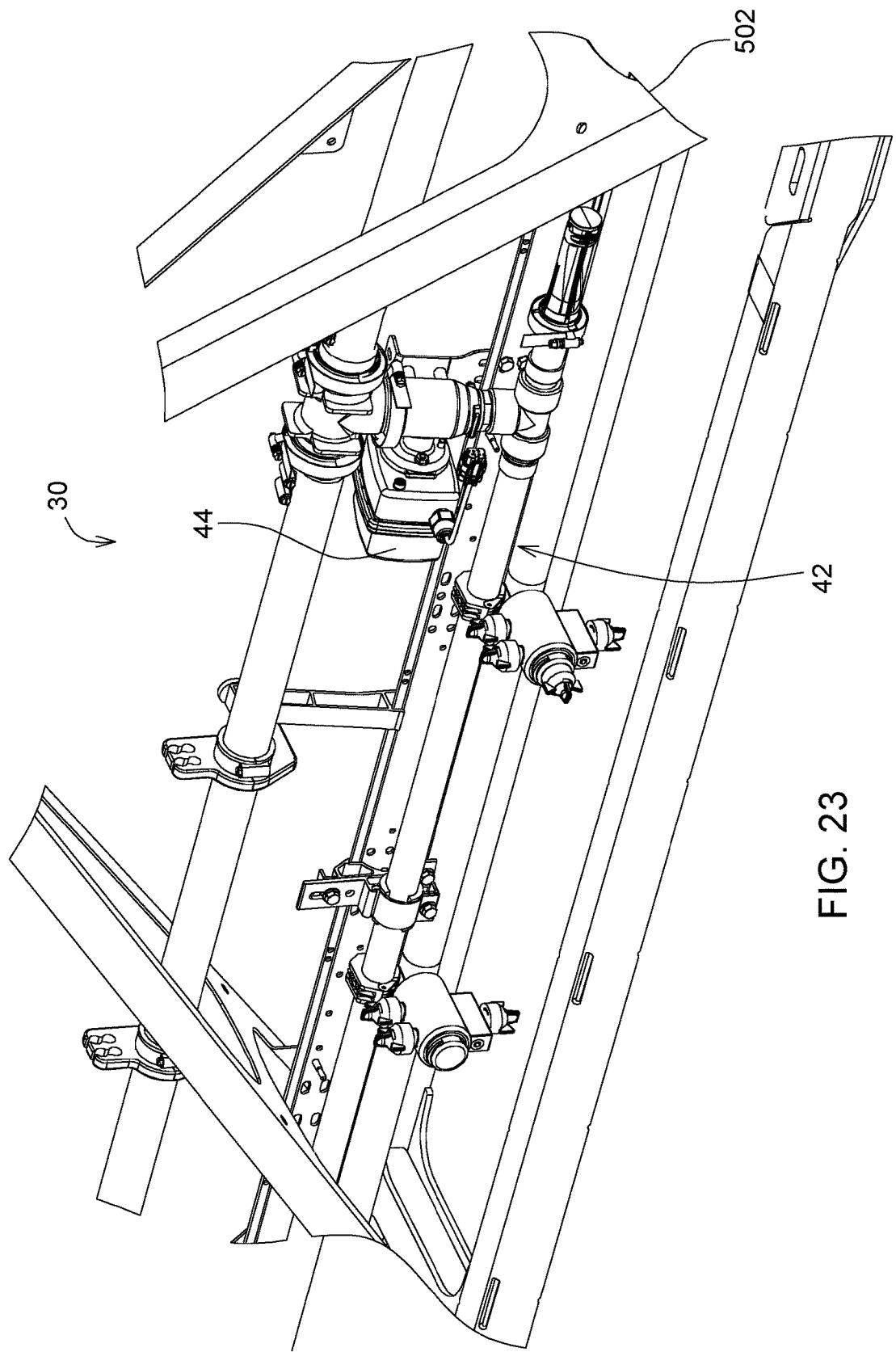
FIG. 23 depicts an example of a metallic or fiber boom having trusses, in between which are nozzles having flow sensors. The sensors communicates either wirelessly or wired (e.g. CAN-bus) with a processing circuit such as a central CPU or computer.
Figure 24:
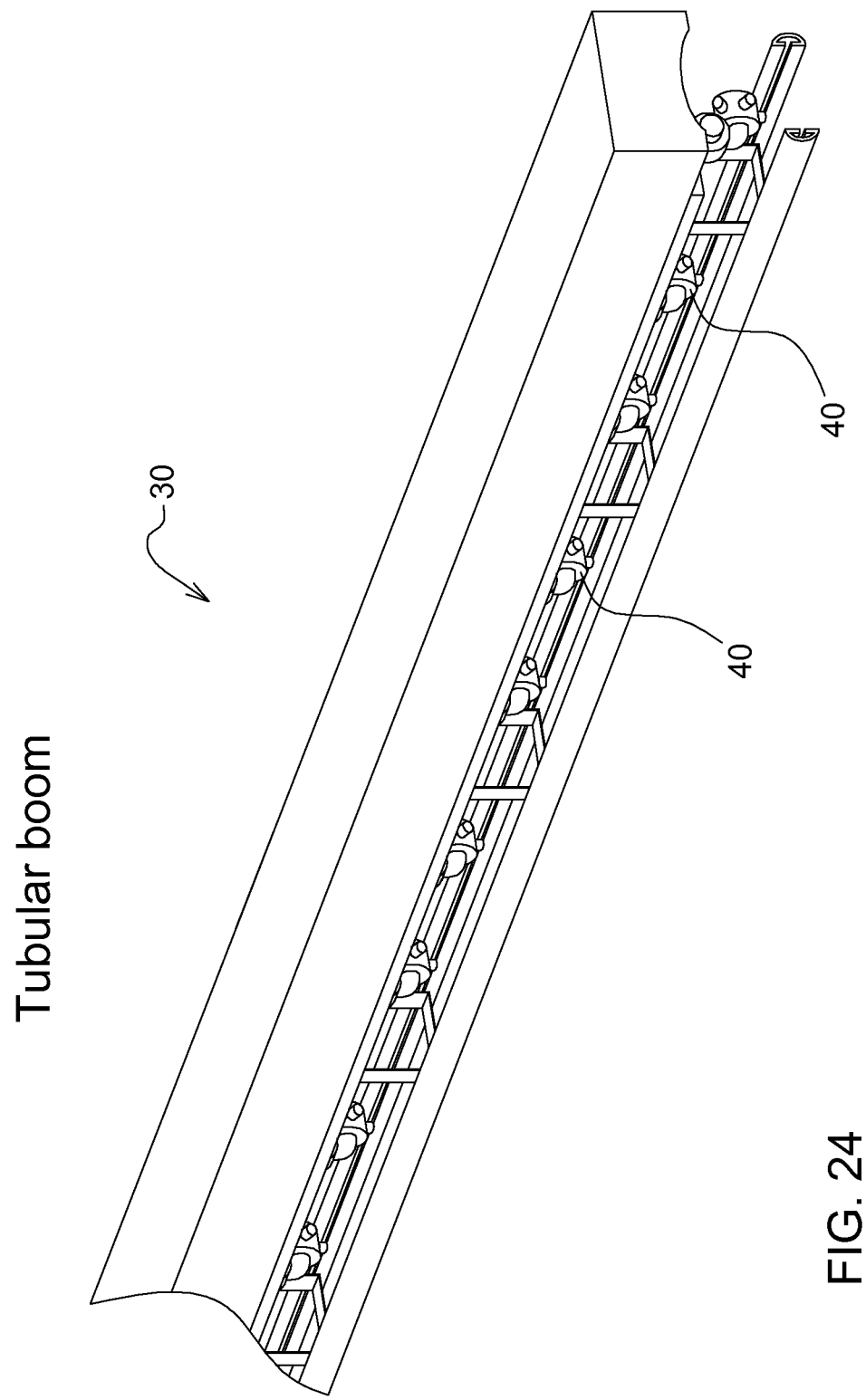
FIG. 24 depicts an example of a lightweight metallic or composite fiber boom, underneath of which are nozzles having fluid flow sensors. The electronic signal wiring is routed in a hollow of the boom.

FIGS. 22-24 depict various spray nozzle assemblies, booms, fluid distribution pipes and nozzles that contain the thermistor 50 and internal or external electronics to determine the presence of a fluid clog. If the nozzle 40 has multiple outlets, if there is fluid clog anywhere along the pathway to the operating outlet, the fluid will build up and become stagnant at the location of thermistor 50. FIG. 22 depicts an example of a suspension lightweight fiber boom, behind which are nozzles 40 having fluid flow sensors. The electronic signal wiring is routed in the hollow of the tubular boom. In one example, the fluid distribution pipe is attached to and underneath the boom. These booms are either towed or the vehicle is a motorized self-propelled agricultural sprayer. FIG. 23 depicts an example of a metallic or fiber boom having trusses, in between which are nozzles having flow sensors. The sensors communicates either wirelessly or wired (e.g. CAN-bus) with a processing circuit such as a central CPU or computer. FIG. 24 depicts an example of a lightweight metallic or composite fiber boom, underneath of which are nozzles having fluid flow sensors. The electronic signal wiring is routed in the hollow of the boom. Each of the nozzles 40 mounted to the fluid distribution pipe generates a reading of the thermistor 50. The readings are collected in a central controller circuit or computer such as located adjacent to the section valves 44 or at the cab of the vehicle towing the spray assembly. Lightweight booms are suited to having spray nozzles that include clog or plug detection because there is extra weight associated with additional electronics and detectors.

When anomalous behavior is flagged, a number of actions may ensue automatically. For example, a visual or audio alert is generated by a central controller or a computer. The alerts indicate either a fixed-threshold condition that is surpassed or a graded level as to the severity of the clogged condition or magnitude of flow rate. In various embodiments of the fluid flow monitoring system, there are also multiple possible automated responses and modes to resolve the clogged condition. Alternatively, some or all of the modes of correction are available to an operator to select individually.

One example of corrective action is that a plugged condition is removed by a plunging method, using the dual-valve vibration to loosen or dislodge debris in a nozzle 40. Sharp, quick vibrations, both valves pushing and pulling simultaneously for maximum movement to push the fluid and debris around. Alternatively, the two valves are moved apart to create a vacuum in the orifice and then sudden pressure is applied when the two valves are pushed towards each other. This jogging or plunging motion is used to expel the particles trapped in a duct, or more often, in a tip of the nozzle 40. After the jogging motion, the fluid is flushed out (along with the particles) through a check valve 302 or even through the nozzle tips. In another embodiment, small quick vibrations are created by the valves together with a motion of the membrane.

Another example corrective action includes using the ability of the sieve or membrane in the orifice of the nozzles to catch larger undesirable particles. The nozzles 40 are mounted to booms that rotate and turn the nozzles 40 upside down to help dispel debris. Or, the boom wings are raised, dipped or rotated to reverse the direction of fluid flow. Another embodiment includes rotating the fluid distribution pipe or the boom on its long axis, repeat the throttle, plunging action and/or vibration using the opposing valves, to expel trapped particles out of a nozzle 40. Alternatively, if one nozzle tip is clogged, the nozzle turret rotates (automatically or manually, e.g. described in U.S. patent application Ser. No. 14/506,057) to another position to spray fluid out of another nozzle tip.

The aforementioned thermal sensors are generally superior to vibration sensors as detectors due to cost and to avoid disturbing the spray pattern or to be limited to certain types of nozzles. Thermal sensors can be used with fluid pulsing or continuous type nozzles, but vibration sensors are for pulse-type nozzles. Finally, the orientation and directions stated and illustrated in this disclosure should not be taken as limiting. Many of the orientations stated in this disclosure and claims are with reference to the direction of travel of the equipment. But, the directions, e.g. "top," are merely illustrative and do not orient the embodiments absolutely in space. That is, a structure manufactured with something on "top" is merely an arbitrary orientation in space that has no absolute direction. Also, in actual usage, for example, the boom equipment may be operated or positioned at an angle because the implements may move in many directions on a hill; and then, "top" is pointing to the "side." Thus, the stated directions in this application may be arbitrary designations.

In the present disclosure, the descriptions and example embodiments should not be viewed as limiting. Rather, there are variations and modifications that may be made without departing from the scope of the appended claims.

What is claimed is:

1. A system to monitor fluids in nozzles, the system comprising:
   a spray nozzle configured to release a fluid according to a desired flow rate;
   a thermal material positioned in a flow path of the fluid inside the spray nozzle in fluid communication with an inlet integrally formed as part of a circular mount of the spray nozzle, wherein the thermal material is entirely enclosed within a body of the spray nozzle, and is sized and dimensioned to conform to an interior surface of an orifice coaxially aligned with the inlet;
   an electronic feedback circuit designed to attempt to maintain at least one of a current through the thermal material and a voltage across the thermal material;
   wherein a measured value of at least one of the current and the voltage different from a target value indicates a change in resistance of the thermal material, and wherein a degree of a plugged condition or a type of fluid flow restriction is determined based on the measured change in resistance;
   wherein a range of the measured value is correlated with an actual flow rate of the fluid, and wherein the range of the measured value is dynamically adjusted as the flow rate increases or decreases to maintain at least one of the current through the thermal material or the voltage across the thermal material by adjusting a baseline signal based on a computed average of the current; and
   a digital processor circuit designed to generate an output signal to initiate a corrective action to disable current flow through the thermal material if the actual flow rate falls below a predetermined threshold to allow for a temperature of the thermal material to decrease, and
   wherein a reset command is generated by the digital processor circuit to reenable current flow through the thermal material when the temperature reaches a lower temperature threshold.

2. The system of claim 1, wherein the electronic feedback circuit is electronically connected to leads of the thermal material, and at least part of the electronic feedback circuit is outside of the flow path but still inside the spray nozzle.

3. The system of claim 1, wherein the electronic feedback circuit is in communication with a computer having a screen that displays an alert of the spray nozzle, as determined by a deviation of the measured value past a pre-set threshold.

4. The system of claim 1, wherein the electronic feedback circuit includes a pulse width modulated circuit, and wherein a pulse width is adjusted to maintain the current through the thermal material.

5. The system of claim 1, wherein the thermal material comprises at least one of a thermistor and a resistor.

6. The system of claim 5, wherein a sense resistor is in series with the thermal material, and the voltage across the sense resistor indicates the current through the thermal material.

7. The system of claim 5, wherein the current or the voltage past a threshold value is flagged as a stagnant state of the spray nozzle and an alert is issued.

8. The system of claim 5, wherein the spray nozzle includes multiple thermal materials, each of which is associated with a fluid outlet of the spray nozzle.

9. The system of claim 1, wherein a plurality of the spray nozzle is mounted on a spray boom for an agricultural application, and wherein each of the plurality of spray nozzles includes the thermal material to provide flow values; and a deviation among the flow values indicate anomalous fluid flow in at least one of the plurality of spray nozzles associated with the deviation.

10. An agricultural spray system comprising:
    a spray boom mounted on a motor vehicle;
    a fluid distribution pipe mounted to the spray boom;
    spray nozzles mounted along the fluid distribution pipe to receive a fluid; each of the spray nozzles include a thermal sensor system having:
       a thermal sensor positioned in a fluid flow path inside each of the spray nozzles in fluid communication with an inlet integrally formed as part of a circular mount of the spray nozzle, wherein the thermal sensor is entirely enclosed within a body of the spray nozzle, and is sized and dimensioned to conform to an interior surface of an orifice coaxially aligned with the inlet;

an electronic circuit that attempts to maintain at least one of a current through the thermal sensor and a voltage across the thermal sensor;

wherein a measured value of at least one of the current and the voltage different from a target value indicates a change in resistance of the thermal sensor, and wherein a degree of a plugged condition or a type of fluid flow restriction is determined based on the measured change in resistance;

wherein the measured value correlates with a flow rate of the fluid in each of the spray nozzles, and wherein a range of the measured value is dynamically adjusted as the flow rate increases or decreases to maintain at least one of the current through the thermal sensor or the voltage across the thermal sensor by adjusting a baseline signal based on a computed average of the current;

a digital processor circuit designed to generate an output signal to initiate a corrective action to disable current flow through the thermal sensor if the flow rate falls below a predetermined threshold to allow for a temperature of the thermal sensor to decrease, and wherein a reset command is generated by the digital processor circuit to reenable current flow through the thermal sensor when the temperature reaches a lower temperature threshold.

11. The agricultural spray system of claim 10, wherein the electronic circuit is electronically connected to leads of the thermal sensor, and at least part of the electronic circuit is outside of the fluid flow path but still inside each of the spray nozzles; and wherein the electronic circuit includes a pulse width modulated circuit, and wherein a pulse width is adjusted to maintain the current through the thermal sensor.

12. The agricultural spray system of claim 10, wherein the measured value from each of the spray nozzles is compared with a maximum and a minimum threshold value.

13. The agricultural spray system of claim 10, wherein initiating the corrective action further comprises initiating a corrective action to expel a stagnant state, wherein the current or the voltage past a threshold value is flagged as the stagnant state of the spray nozzle; and where under the stagnant state, an alert is issued.

14. The agricultural spray system of claim 13, wherein the corrective action includes at least changing a position of the spray boom, changing a position of the spray nozzle, or plunging a valve inside the spray nozzle associated with the stagnant state.

15. The agricultural spray system of claim 10, wherein the thermal sensor comprises at least one of a thermistor or a resistor.

16. The agricultural spray system of claim 13, wherein each of the spray nozzles includes a first flow valve and a second flow valve; the thermal sensor is located between the first flow valve and a first spray nozzle outlet; and a second thermal sensor is located between the second flow valve and a second spray nozzle outlet.

17. The agricultural spray system of claim 10, wherein the spray boom comprises composite fiber material.

18. The agricultural spray system of claim 10, wherein the fluid distribution pipe comprises a fluid section valve; and the fluid section valve also includes the thermal sensor to detect a section flow rate through the section valve.

19. An agricultural spray system comprising:

a spray boom mounted on a motor vehicle;

a fluid distribution pipe mounted to the spray boom;

spray nozzles mounted along the fluid distribution pipe to receive a fluid; each of the spray nozzles include a single thermal material located between each fluid valve and corresponding fluid outlet that is sized and dimensioned to conform to an interior surface of an orifice coaxially aligned with a fluid inlet integrally formed as part of a circular mount of each of the spray nozzles, and wherein the single thermal material is entirely enclosed within a body of each of the spray nozzles;

an electronic circuit configured to attempt to maintain at least a current through the thermal material or a voltage across the thermal material;

wherein a measured value of at least the current or the voltage different from a target value indicates a change in resistance of the thermal material, and wherein a degree of a plugged condition or a type of fluid flow restriction is determined based on the measured change in resistance;

wherein the measured value correlates with a flow rate of the fluid in each of the spray nozzles, and wherein a range of the measured value is dynamically adjusted as the flow rate increases or decreases to maintain at least one of the current through the thermal material or the voltage across the thermal material by adjusting a baseline signal based on a computed average of the current;

a digital processor circuit designed to generate an output signal to initiate a corrective action to disable current flow through the thermal material if the actual flow rate falls below a predetermined threshold to allow for a temperature of the thermal material to decrease, and wherein a reset command is generated by the digital processor circuit to reenable current flow through the thermal material when the temperature reaches a lower temperature threshold.

20. The agricultural spray system of claim 19, wherein the single thermal material includes electrical leads; and the electrical leads socket into the electronic circuit; and wherein the electronic circuit is protected from a flow path of the fluid but still located in each of the spray nozzles.

* * * * *